United States Patent
Zhu et al.

(10) Patent No.: US 9,063,951 B1
(45) Date of Patent: *Jun. 23, 2015

(54) PRE-FETCHING MAP DATA BASED ON A TILE BUDGET

(75) Inventors: Ronghui Zhu, Sunnyvale, CA (US); Thomas G. Nourse, Half Moon Bay, CA (US)

(73) Assignee: GOOGLE INC., Mountain View, CA (US)

( * ) Notice: Subject to any disclaimer, the term of this patent is extended or adjusted under 35 U.S.C. 154(b) by 202 days.

This patent is subject to a terminal disclaimer.

(21) Appl. No.: 13/297,382

(22) Filed: Nov. 16, 2011

(51) Int. Cl.
*G06F 15/16* (2006.01)
*G06F 17/30* (2006.01)

(52) U.S. Cl.
CPC .... *G06F 17/30241* (2013.01); *G06F 17/30902* (2013.01)

(58) Field of Classification Search
USPC .......... 709/203; 701/409, 410, 425, 426, 430, 701/450, 451, 452, 453
See application file for complete search history.

(56) References Cited

U.S. PATENT DOCUMENTS

| | | | |
|---|---|---|---|
| 4,984,279 A | 1/1991 | Kidney et al. | |
| 5,345,086 A | 9/1994 | Bertram | |
| 5,793,310 A | 8/1998 | Watanabe et al. | |
| 5,848,373 A | 12/1998 | DeLorme et al. | |
| 6,061,688 A | 5/2000 | Kilpatrick et al. | |
| 6,073,076 A | 6/2000 | Crowley et al. | |
| 6,094,685 A | 7/2000 | Greenberg et al. | |
| 6,191,782 B1 | 2/2001 | Mori et al. | |
| 6,199,150 B1 | 3/2001 | Yoshikawa | |
| 6,330,453 B1 | 12/2001 | Suzuki et al. | |
| 6,400,690 B1 | 6/2002 | Liu et al. | |
| 6,442,757 B1 | 8/2002 | Hancock et al. | |
| 6,453,233 B1 | 9/2002 | Kato | |
| 6,546,334 B1 | 4/2003 | Fukuchi et al. | |
| 6,571,279 B1 | 5/2003 | Herz et al. | |
| 6,671,424 B1 * | 12/2003 | Skoll et al. | 382/305 |
| 6,691,128 B2 * | 2/2004 | Natesan et al. | 701/430 |

(Continued)

FOREIGN PATENT DOCUMENTS

| | | |
|---|---|---|
| KR | 10-2008-071228 | 8/2008 |
| WO | WO-98/28714 A1 | 7/1998 |
| WO | WO-2009/027161 A1 | 3/2009 |

OTHER PUBLICATIONS

Kirchner et al. "A Location-aware Prefetchting Mechanism," Project work at Distributed Information Systems Laboratory LSIR (2004).

(Continued)

*Primary Examiner* — Liangche A Wang
*Assistant Examiner* — Cheikh Ndiaye
(74) *Attorney, Agent, or Firm* — Marshall, Gerstein & Borun LLP

(57) ABSTRACT

A pre-fetching map data system and method identifies a subset of map data to corresponding to one or more points of interest to be displayed on the map. The map data is stored on a remote map database in map data tiles. The pre-fetching map data system identifies those map data tiles that correspond to the one or more points of interest, where the identified pre-fetch map data tiles are sent from the remote database to a client device for cache storage. The number of pre-fetch map data tiles are determined using a tile budget, such as a maximum number of map data tiles that may be stored on the client device or a maximum amount of map data memory that can be consumed on the client device.

35 Claims, 15 Drawing Sheets

(56) References Cited

U.S. PATENT DOCUMENTS

| | | |
|---|---|---|
| 6,853,911 B1 | 2/2005 | Sakarya |
| 6,889,134 B2 | 5/2005 | Nakane et al. |
| 7,006,820 B1 | 2/2006 | Parker et al. |
| 7,050,905 B2 | 5/2006 | Nemeth |
| 7,136,748 B2 | 11/2006 | Umezu et al. |
| 7,263,368 B2 | 8/2007 | Knauerhase et al. |
| 7,315,259 B2 | 1/2008 | Sacks |
| 7,327,349 B2 | 2/2008 | Robbins et al. |
| 7,461,528 B2 | 12/2008 | Taniguchi et al. |
| 7,464,109 B2 | 12/2008 | Modi |
| 7,472,172 B2 | 12/2008 | Anderson et al. |
| 7,502,780 B2 | 3/2009 | Thorpe |
| 7,502,876 B1 | 3/2009 | Nemirovsky et al. |
| 7,529,639 B2 | 5/2009 | Rasanen et al. |
| 7,551,182 B2 | 6/2009 | Bethune et al. |
| 7,571,422 B2 | 8/2009 | Adel et al. |
| 7,577,520 B2 | 8/2009 | Nomura |
| 7,584,434 B2 | 9/2009 | Okamura |
| 7,610,147 B2 | 10/2009 | Umezu et al. |
| 7,663,671 B2 | 2/2010 | Gallagher et al. |
| 7,710,421 B2 | 5/2010 | Muramatsu |
| 7,711,473 B2 | 5/2010 | Sekine et al. |
| 7,734,412 B2* | 6/2010 | Shi et al. .......... 701/421 |
| 7,739,037 B2 | 6/2010 | Sumizawa et al. |
| 7,796,837 B2 | 9/2010 | Lueck |
| 7,831,383 B2 | 11/2010 | Oohashi |
| 7,831,387 B2 | 11/2010 | Golding et al. |
| 7,839,421 B2 | 11/2010 | Bethune et al. |
| RE41,983 E | 12/2010 | Wallner |
| 7,873,465 B2 | 1/2011 | Geelen et al. |
| 7,920,968 B2 | 4/2011 | Chapin et al. |
| 7,925,624 B2 | 4/2011 | Vosshall et al. |
| 7,925,982 B2 | 4/2011 | Parker et al. |
| 7,962,565 B2 | 6/2011 | Coker |
| 7,974,959 B2* | 7/2011 | Sawai et al. .......... 707/695 |
| 7,975,025 B1 | 7/2011 | Szabo et al. |
| 7,983,659 B2 | 7/2011 | Shinya |
| 7,996,445 B2 | 8/2011 | Fair et al. |
| 8,005,612 B2 | 8/2011 | Asahara et al. |
| 8,010,407 B1 | 8/2011 | Santoro et al. |
| 8,014,796 B2* | 9/2011 | Boudreau et al. .......... 455/457 |
| 8,014,945 B2* | 9/2011 | Cooper et al. .......... 701/452 |
| 8,032,297 B2 | 10/2011 | Jakobson |
| 8,060,389 B2 | 11/2011 | Johnson |
| 8,060,406 B2 | 11/2011 | Blegen |
| 8,060,582 B2 | 11/2011 | Bliss et al. |
| 8,078,641 B2 | 12/2011 | Mao et al. |
| 8,095,307 B2 | 1/2012 | Ebert et al. |
| 8,126,885 B2 | 2/2012 | Prasad et al. |
| 8,180,851 B1 | 5/2012 | CaveLie |
| 8,204,966 B1 | 6/2012 | Mendis et al. |
| 8,229,914 B2 | 7/2012 | Ramer et al. |
| 8,280,414 B1 | 10/2012 | Nourse et al. |
| 8,301,371 B2 | 10/2012 | Sheha et al. |
| 8,340,898 B2 | 12/2012 | Currie et al. |
| 8,361,543 B2 | 1/2013 | Nielsen et al. |
| 8,363,065 B2* | 1/2013 | Scott et al. .......... 345/626 |
| 8,385,591 B1 | 2/2013 | Anguelov et al. |
| 8,489,332 B2 | 7/2013 | Tomobe et al. |
| 8,489,669 B2 | 7/2013 | Johnson |
| 8,538,685 B2 | 9/2013 | Johnson |
| 8,543,130 B2 | 9/2013 | Golds |
| 8,549,105 B1 | 10/2013 | Nourse et al. |
| 8,683,008 B1 | 3/2014 | CaveLie |
| 8,711,181 B1 | 4/2014 | Nourse et al. |
| 2002/0067353 A1* | 6/2002 | Kenyon et al. .......... 345/419 |
| 2002/0133491 A1 | 9/2002 | Sim et al. |
| 2003/0187984 A1 | 10/2003 | Banavar et al. |
| 2004/0044752 A1 | 3/2004 | Hamaguchi et al. |
| 2004/0117108 A1 | 6/2004 | Nemeth |
| 2004/0203998 A1 | 10/2004 | Knauerhase et al. |
| 2004/0220730 A1 | 11/2004 | Chen et al. |
| 2005/0287509 A1 | 12/2005 | Mohler |
| 2006/0026170 A1 | 2/2006 | Kreitler et al. |
| 2006/0067224 A1 | 3/2006 | Ohara |
| 2006/0069749 A1 | 3/2006 | Herz et al. |
| 2006/0080032 A1 | 4/2006 | Cooper et al. |
| 2006/0195256 A1 | 8/2006 | Nakamura et al. |
| 2006/0277271 A1 | 12/2006 | Morse et al. |
| 2007/0050128 A1 | 3/2007 | Lee et al. |
| 2007/0080830 A1 | 4/2007 | Sacks |
| 2007/0143014 A1 | 6/2007 | Sekine et al. |
| 2007/0242077 A1* | 10/2007 | Danan .......... 345/536 |
| 2007/0273558 A1 | 11/2007 | Smith et al. |
| 2007/0282621 A1 | 12/2007 | Altman et al. |
| 2007/0282915 A1 | 12/2007 | Vosshall et al. |
| 2008/0065329 A1 | 3/2008 | Wilcox et al. |
| 2008/0071988 A1 | 3/2008 | Schloter et al. |
| 2008/0082225 A1 | 4/2008 | Barrett |
| 2008/0086264 A1 | 4/2008 | Fisher |
| 2008/0102857 A1 | 5/2008 | Kim |
| 2008/0132249 A1 | 6/2008 | Hamilton |
| 2008/0154655 A1 | 6/2008 | Hartmann et al. |
| 2008/0177469 A1 | 7/2008 | Geelen et al. |
| 2008/0192053 A1 | 8/2008 | Howell et al. |
| 2008/0195311 A1* | 8/2008 | Karaoguz et al. .......... 701/208 |
| 2008/0214210 A1 | 9/2008 | Rasanen et al. |
| 2008/0215240 A1 | 9/2008 | Howard et al. |
| 2008/0238723 A1 | 10/2008 | Fein et al. |
| 2008/0270579 A1 | 10/2008 | Herz et al. |
| 2008/0291205 A1 | 11/2008 | Rasmussen et al. |
| 2009/0030778 A1 | 1/2009 | Zapata et al. |
| 2009/0054103 A1 | 2/2009 | Stavenow et al. |
| 2009/0063042 A1* | 3/2009 | Santesson et al. .......... 701/209 |
| 2009/0125228 A1 | 5/2009 | Dicke et al. |
| 2009/0128483 A1 | 5/2009 | Robbins et al. |
| 2009/0132163 A1 | 5/2009 | Ashley, Jr. et al. |
| 2009/0153563 A1 | 6/2009 | Tudose |
| 2009/0182500 A1 | 7/2009 | Dicke |
| 2009/0198767 A1 | 8/2009 | Jakobson et al. |
| 2009/0210388 A1 | 8/2009 | Elson et al. |
| 2009/0228211 A1 | 9/2009 | Rasanen et al. |
| 2009/0244095 A1 | 10/2009 | Bowman et al. |
| 2009/0281718 A1* | 11/2009 | Gibran et al. .......... 701/200 |
| 2009/0287750 A1 | 11/2009 | Banavar et al. |
| 2009/0319177 A1 | 12/2009 | Khosravy et al. |
| 2009/0319181 A1 | 12/2009 | Khosravy et al. |
| 2009/0319188 A1 | 12/2009 | Otto |
| 2009/0326810 A1 | 12/2009 | Callaghan et al. |
| 2010/0017129 A1 | 1/2010 | Wilcox et al. |
| 2010/0020091 A1 | 1/2010 | Rasmussen et al. |
| 2010/0106397 A1 | 4/2010 | Van Essen |
| 2010/0106801 A1 | 4/2010 | Bliss et al. |
| 2010/0117810 A1 | 5/2010 | Hagiwara et al. |
| 2010/0131186 A1 | 5/2010 | Geelen et al. |
| 2010/0153007 A1* | 6/2010 | Crowley .......... 701/206 |
| 2010/0179940 A1 | 7/2010 | Gilder et al. |
| 2010/0182500 A1* | 7/2010 | Ishii et al. .......... 348/441 |
| 2010/0250646 A1 | 9/2010 | Dunagan et al. |
| 2010/0274899 A1 | 10/2010 | Shrivastava et al. |
| 2010/0321399 A1 | 12/2010 | Ellren et al. |
| 2010/0332120 A1 | 12/2010 | Tomobe et al. |
| 2010/0333085 A1 | 12/2010 | Criddle et al. |
| 2011/0054776 A1 | 3/2011 | Petrov et al. |
| 2011/0093515 A1 | 4/2011 | Albanese |
| 2011/0095993 A1 | 4/2011 | Zuverink |
| 2011/0098917 A1 | 4/2011 | LeBeau et al. |
| 2011/0098918 A1 | 4/2011 | Siliski et al. |
| 2011/0130949 A1 | 6/2011 | Arrasvuori |
| 2011/0161875 A1 | 6/2011 | Kankainen |
| 2011/0213798 A1 | 9/2011 | Osuka et al. |
| 2011/0276263 A1 | 11/2011 | Shimotani et al. |
| 2011/0300848 A1 | 12/2011 | Boudreau et al. |
| 2011/0307648 A1 | 12/2011 | Nomura |
| 2011/0316854 A1 | 12/2011 | Vandrovec |
| 2012/0005290 A1 | 1/2012 | Cooper et al. |
| 2012/0022786 A1 | 1/2012 | Siliski et al. |
| 2012/0022787 A1 | 1/2012 | LeBeau et al. |
| 2012/0083995 A1 | 4/2012 | Vorona |
| 2012/0146809 A1 | 6/2012 | Oh et al. |
| 2012/0221239 A1 | 8/2012 | Cooper et al. |
| 2012/0253488 A1 | 10/2012 | Shaw et al. |
| 2012/0254804 A1* | 10/2012 | Sheha et al. .......... 715/834 |

(56) References Cited

U.S. PATENT DOCUMENTS

2013/0097197 A1 4/2013 Rincover et al.
2013/0325307 A1 12/2013 Agarwal et al.
2014/0073358 A1 3/2014 Sridhar et al.

OTHER PUBLICATIONS

Molina, "Aiming and Guiding Navigation with a Non-visual GPS Application," Department of Design Sciences Faculty of Engineering, Lund University (2010).
Office action for U.S. Appl. No. 13/244,717 dated Nov. 15, 2011.
Office action for U.S. Appl. No. 13/244,764 dated Nov. 28, 2011.
Piras et al., "Compact GML: merging mobile computing and mobile cartography," CRS4, Center for Advanced Studies, Research and Development in Sardinia (2004).
Reichenbacher et al., "The World in Your Pocket—Towards a Mobile Cartography," Proc. of the 20th International Cartographic Conference (2001).
Weber, "Mobile Map Browsers: Anticipated User Interaction for Data Pre-Fetching," Thesis, The University of Maine, (2010).
Google Developers, "Google Maps API," (2012). Retrieved from the Internet on Aug. 31, 2012: URL:https://developers.google.com/maps/.
International Search Report and Written Opinion for Application No. PCT/US2012/051574, dated Feb. 15, 2013.
International Search Report and Written Opinion for Application No. PCT/US2012/051577, dated Feb. 15, 2013.
International Search Report and Written Opinion for Application No. PCT/US2012/065002, dated Mar. 29, 2013.
International Search Report and Written Opinion for Application No. PCT/US2012/065008, dated Mar. 29, 2013.
International Search Report for Application No. PCT/US2012/051564, dated Feb. 18, 2013.
Mapquest, "JavaScript Maps API," (2012). Retrieved from the Internet on Aug. 31, 2012: URL:http://developer.mapquest.com/web/products/featured/javascript.
MSDN, "Get Started Using Bing Maps," (2012). Retrieved from the Internet on Aug. 31, 2012: URL:http://msdn.microsoft.com/en-us/library/dd877180.aspx.
Wiki, "API," (2012). Retrieved from the Internet on Aug. 31, 2012: URL:http://wiki.openstreetmap.org/wiki/API.
Descampe et al., "Data Prefetching for Smooth Navigation of Large Scale JPEG 2000 Images," IEEE, Multimedia and Expo, pp. 1-4 (2005).
International Preliminary Report on Patentability for Application No. PCT/US2012/051564, dated Apr. 1, 2014.
Weber et al., "Mobile Map Browers: Anticipated User Interaction for Data Pre-Fetching," University of Maine, 101 pages (2010).
International Preliminary Report on Patentability for Application No. PCT/US2012/051574, dated Jun. 17, 2014.
International Preliminary Report on Patentability for Application No. PCT/US2012/051577, dated Jun. 17, 2014.
International Preliminary Report on Patentability for Application No. PCT/US2012/065002, dated May 20, 2014.
International Preliminary Report on Patentability for Application No. PCT/US2012/065008, dated Jun. 10, 2014.
Extended European Search Report for Application No. 12855169.4, dated Mar. 23, 2015.
Magdalene et al., "Cache Prefetch and Replacement with Dual Valid Scopes for Location Dependent Data in Mobile Environments," Proceedings of the 11th International Conference on Information Integration and Web-Based Applications & Services, pp. 364-371 (2009).
Ren et al., "Using Semantic Caching to Manage Location Dependent Data in Mobile Computing," Proceedings of the Annual International Conference on Mobile Computing and Networking, pp. 210-221 (2000).

\* cited by examiner

PRE-FETCHING MAP DATA BASED ON A TILE BUDGET

FIELD OF TECHNOLOGY

The present disclosure relates to map data optimization and more specifically to a system and a method to pre-fetch map data from a remote map database.

BACKGROUND

With the widespread use of mobile devices, such as mobile phones, personal data assistants, tablet personal computers, etc., consumer demand for ready access to varied types of data continues to grow at a high rate. These devices are used to transmit, receive, and store text, voice, image, and video data. Consumers often look to store large numbers of applications on these devices, such that mobile devices are often touted more for the number of available applications, than internal processor speed. While consumers have come to desire fast access to data, the sheer amount of data required to run these applications places a premium on data management, both at the device level and at the network level. This premium limits the effectiveness of applications such as mapping applications, which typically require comparatively large amounts of network data.

Mapping applications are found in a variety of mobile devices, including car navigation systems, hand-held GPS units, mobile phones, and portable computers. These applications are among the most frequently used applications and are considered, by some, necessary for modern living. Although the underlying digital maps are easy to use from a user's perspective, creating a digital map is a data intensive process. Every digital map begins with a set of raw data corresponding to millions of streets and intersections. That raw map data is derived from a variety of sources, each providing different amounts and types of information. To effectively map a location, locate a driving route between a source and a destination, identify points of interest, etc. requires substantial amounts of data. Furthermore, many mapping applications require display of different map data at different zoom levels, i.e., different scales, where the amount of detail and that nature of that detail changes at each zoom level. For example, at a lowest zoom level, scaled farthest away from a target, the map data may contain the boundaries of continents, oceans, and major landmasses. At subsequent zoom levels, that map data may identify countries, states, homelands, protectorates, other major geographic regions. While at even further subsequent zoom levels, that map data may contain major roads, cities, towns, until eventually the map data contains minor roads, buildings, down to even sidewalks and walk ways depending on the region. The amount of detail is determined by the sources of information used to construct the map data at each zoom level. But no matter the zoom level, the amount of information is voluminous and generally too large for storage, in total, on mobile devices and too large for continuous download over a wireless communication network.

In operation, mapping applications typically download map data to the mobile device through a wireless communication network and in response to a user entering a location of interest and/or based on the current location of the mobile device, such as the current global positioning satellite (GPS) data or current cellular network location data for the device. A conventional technique for downloading map data is to have the mobile device communicate this location data to a remote processor on the wireless communication network, which, in response, downloads all map data to the mobile device or the map data requested for display to the user.

Generally speaking, the map data is stored in blocks known as map data tiles, where the number of map data tiles increases with zoom level. The remote processor provides a subset of the available map data tiles for a particular location or region to the mobile device for storage and display at any particular time via a map display application. By providing large numbers of map data tiles, the mobile device may buffer the map data for display to the consumer as the consumer scrolls across an area using the mapping application looking for adjacent or other mapping locations. However, the larger the number of map tiles provided at any particular time increases the download time and buffer memory usage while the user is using the map display application.

Conventionally, map data tiles are downloaded and cached, but in a crude manner that is unable to take advantage of memory surpluses on devices and unable to take advantage of network bandwidth surpluses, e.g., when the user is not using the device. The conventional techniques are similarly deficient in the face of lacking memory and reduced bandwidth. As a result, there is a need to have more intelligent mechanisms for downloading map data, in particular map data tiles, to sufficiently satisfy the needs of the user, while doing so in a manner that addresses network bandwidth and memory conditions.

SUMMARY

In an embodiment, a computer-implemented method comprises: identifying, on a client device, one or more map points of interest; identifying, based on the map points of interest, pre-fetch map data tiles to be requested from a remote map database and stored on the client device for eventual rendering of a visual display of map data in response to a subsequent user request; requesting, from a remote map database storing the map data, the pre-fetch map data tiles corresponding to one or more map points of interest; receiving, at the client device, the pre-fetch map data tiles from the remote map database and, during receiving of the pre-fetch map data tiles, determining, at the client device, if the tile budget has been met by the received pre-fetch map data tiles, where, if a tile budget has been met, the client device stops receiving additional pre-fetch map data tiles from the map database, and if the tile budget has not been met, the client device, continues receiving additional pre-fetch map data tiles from the map database until the tile budget is met or until all pre-fetch map data tiles corresponding to the one or more map points of interest have been received at the client device; and storing the received pre-fetch map data tiles in a local memory on the client device until a subsequent user request.

In another embodiment, a computer-readable medium storing instructions, the instructions when executed by a processor cause the processor to: identify, on a client device, one or more map points of interest; identify, based on the map points of interest, pre-fetch map data tiles to be requested from a remote map database and stored on the client device for eventual rendering of a visual display of map data in response to a subsequent user request; request, from a remote map database storing the map data, the pre-fetch map data tiles corresponding to one or more map points of interest; receive, at the client device, the pre-fetch map data tiles from the remote map database and, during receiving of the pre-fetch map data tiles, determining, at the client device, if a tile budget has been met by the received pre-fetch map data tiles, where, if the tile budget has been met, the client device stops receiving additional pre-fetch map data tiles from the map database, and if the tile budget has not been met, the client device, continues receiving additional pre-fetch map data tiles from the map database until the tile budget is met or until all pre-fetch map data tiles corresponding to the one or more map points of interest have been received at the client device; and store the received pre-fetch map data tiles in a local memory on the client device until a subsequent user request.

In yet another embodiment, a computer system for fetching map tile data to be used in constructing a visual display of map data on a client device, the computer system comprises: a display module for constructing and displaying the visual display of the map data, where the map data is stored in a remote map database as a plurality of map data tiles; a map point identifier module that identifies one or more map points of interest that define pre-fetch map data tiles to be requested from a remote map database and stored on the client device for eventual rendering of a visual display of map data in response to a subsequent user request; a database interface module to request, from the map database, the pre-fetch map data tiles from the remote map database and to receive the pre-fetch map data tiles from the remote map database; and a tile budget module that, during receiving of the pre-fetch map data tiles, is to determine if the tile budget has been met by the received pre-fetch map data tiles, where, if the tile budget has been met, the database interface module is to stop receiving additional pre-fetch map data tiles from the remote map database, and if a tile budget has not been met, the database interface module is to continue receiving additional pre-fetch map data tiles from the map database until the tile budget is met or until all pre-fetch map data tiles corresponding to the one or more map points of interest have been received at the client device.

In some embodiments, the tile budget is a preset total number of map tiles or preset total amount of map data. In some embodiments, the tile budget may be checked after the client device has received each of the pre-fetch map data tiles.

In some embodiments a plurality of map points of interest are identified for pre-fetching and that plurality is prioritized in order from highest to lowest, where pre-fetching occurs on the highest priority map point of interest first.

In some embodiments, the map database stores map data at different zoom levels, each containing respective sets of map data tiles, such that pre-fetching of map data tiles occurs at a plurality of the zoom levels.

The features and advantages described in this summary and the following detailed description are not all-inclusive. Many additional features and advantages will be apparent to one of ordinary skill in the art in view of the drawings, specification, and claims hereof.

DETAILED DESCRIPTION

Figure 1:
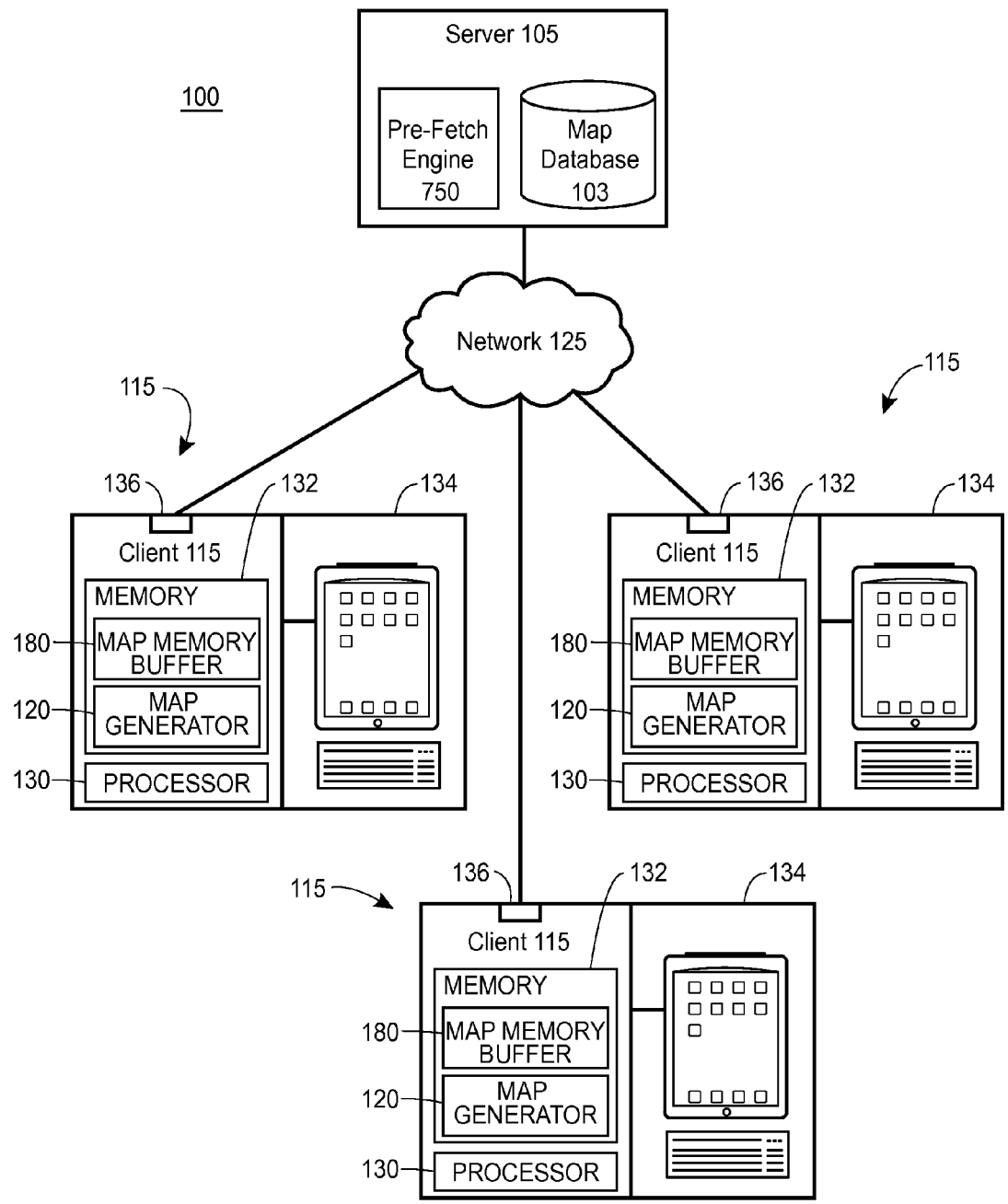
FIG. 1 is high-level block diagram of a wireless network depicting a wireless base station connected to a server containing map data for selectively communicating that map data to a various client devices on the network.

The present application describes techniques for fetching map data over a selected subset of the entire map data available, by identifying one or more points of interest for display on client device. The techniques, which may be implemented on a client device such as a mobile or handheld device, will access map data pertaining to these points of interest from a remote server. In this way, the techniques do not need to access an entire map database, but rather only a portion thereof. To avoid accessing too much of the map data, the techniques employ a map memory budgeting process that allows access to a threshold amount of map data. When the map data is stored at the remote server in the form of map data tiles, the techniques allow the client device to perform tile budgeting on the received map data tiles to limit the amount of map data accessed.

More particularly, the present application describes techniques for fetching map data over a selected subset of the entire map data available, by identifying one or more points of interest for display on client device, where those points of interest are identified by the user of the client device, for example by the user searching for a particular location or direction between locations through a mapping application on the client device. In other embodiments, the points of interest are automatically determined by the client device, for example by the client device identifying a set of most recently accessed points of interest or a set of most frequency accessed points of interest. In either case, the points of interest are identified to a remote server that contains a map database of the entire map data, including map data for the points of interest. With the points of interest identified, the remove server begins transmitting the map data, corresponding to these points of interest, to the client device for storage and display to the user. Storing map data in data blocks known as map data "tiles," the remote server sends the map data in the form of a map data tiles. For each point of interest, the server may send an identified set of map data tiles, termed pre-fetch map data tiles. The client device receives the pre-fetch map data tiles until a tile budget has been met, which the client device may assess upon receipt of each map data tile sent from the server or which it may assess periodically, for example, after receipt of any subset of map data tiles sent from the server. The client device continues receiving map data tiles until the tile budget is met. In some embodiments, the client device prioritizes the points of interest and requests and receives map data tiles in an order according to these priorities. If the client device receives all of the pre-fetch map data tiles for the highest priority point of interest, then the client device starts requesting and receiving the pre-fetch map data tiles for the next highest priority point of interest, which the client device keeps doing until a tile budget has been met. The tile budget may be a fixed number of map tiles or it map be a total mount of map data that is to be stored on the client device.

Pre-fetching refers to requesting map data from a remote map database, such as that of a remote server, prior to any specific user request for map data, so that map data may be collected and buffered on a device until a specific user request for map data. In this way, pre-fetching seeks to collect map data in the background, before that map data is called upon to construct a visual display, thereby reducing (and even eliminating) the need for a client device to request map data only after a user request. The pre-fetched map data is automatically identified, requested, and stored on the client device for subsequent use in constructing a visual display. As discussed in examples below, where that map data is stored in the remote map database in the form of map data tiles, the pre-fetching is of map data tiles.

FIG. 1 is a high-level block diagram that illustrates a computing environment for a pre-fetch map data system 100 that may be used to access and store map data within a map database. As illustrated in FIG. 1, the computing environment includes a map database 103 connected to or disposed within a server 105, which is, in turn, connected to a number of client devices 115 through a network 125. The network 125 includes but is not limited to any combination of a LAN, a MAN, a WAN, a mobile, a wired or wireless network, a private network, or a virtual private network. While only three clients 115 are illustrated in FIG. 1 to simplify and clarify the description, it is understood that any number of client computers are supported and can be in communication with the server 105.

Both the server 105 and the clients 115 are computers that may include a CPU 130 (only shown in the clients), one or more computer readable memories 132, one or more user interfaces 134 (keyboard, touch screen, etc.), a network interface 136, one or more peripheral interfaces, and other well known components. As is known to one skilled in the art, other types of computers can be used that have different architectures. The client devices 115 represent any suitable handheld and/or mobile device, such as a mobile phone, personal data assistant, laptop computer, tablet personal computer, car navigation system, hand-held GPS unit, or "smart" device. More broadly, the client devices 115 represent any personal computing device, database, server, or network of such devices, or any other processing device having a user interface and CPU and capable of displaying a visual rendition of map data accessed from the map database 103 or other remote source of map data. Furthermore, while in some examples, the network 125 is described as a wireless network, the network 125 may be any wired or wireless network, where the clients 115 are devices on the network.

The server 105 and the clients 115 are also adapted to execute computer program modules for providing functionality described herein. As used herein, the terms "module" and "routine" refer to computer program logic used to provide the specified functionality. Thus, a module or a routine can be implemented in hardware, firmware, and/or software. In one embodiment, program modules and routines are stored on a storage device, loaded into memory, and executed by a processor or can be provided from computer program products that are stored in tangible computer-readable storage mediums (e.g., RAM, hard disk, optical/magnetic media, etc.).

The map database 103, which may be stored in or may be separate from the server 105, contains map data that can be used to generate a digital map or that can be used by, for example, a navigation system to determine routes between two locations. Physical roads, waterways, parks, landmarks, and other geographic elements may be represented in the map data by a list of nodes and segments that connect those nodes. Each node corresponds to a specific geographic location in the physical world. The data representation for each node generally includes a set of coordinates (e.g., latitude and longitude) and an association with one or more segments. For roads, each segment corresponds to a section of a physical location that begins at one node and ends at a different node. The data representation for each road segment, for example, can include a length and a number of attributes, such as a street name, a priority (e.g., a highway or a local road), speed information, a surface type, a road width, an indication of whether the road segment is a one-way segment, address ranges, usage (e.g., ramp or trail), etc.

The map data stored in the map database 103 can be obtained from several different sources such as the New York City Open Accessible Space Information System (OASIS) and the U.S. Census Bureau Topologically Integrated Geographic Encoding and Referencing system (TIGER). The map data can also be accessed by one of the map generators 120, modified, and stored back into the database 103. Further, the database 103 does not need to be physically located within server 105. For example, the database 103 can be partially stored within a client 115, can be stored in external storage attached to the server 105, or can be stored in a network attached storage. Additionally, there may be multiple servers 105 that connect to a single database 103. Likewise, the map database 103 may be stored in multiple different or separate physical data storage devices.

Each client 115 executes one of the map generators 120, each of which receives pre-fetch map data from the server 105 and generates a visual display of the received map data that is presented to the user on a display of the interface 134. The map generator 120 is able to adjust that visual display in response to user interactions with the interface 134, for example, adjusting which map data is visualized at any given time in response to a user selecting to scroll (left, right, up, down, etc.) through the visual display, or in response to the user selecting to change the zoom level (e.g., scale) of the displayed map data.

Figure 2:
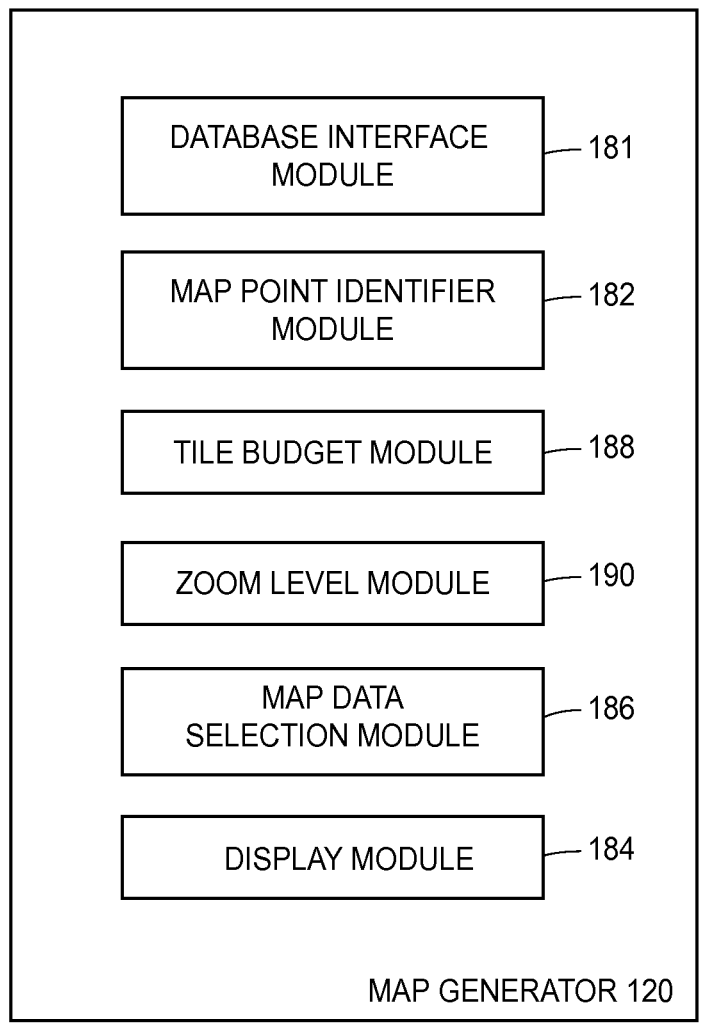
FIG. 2 is a block diagram of an example map generator in the client device of FIG. 1.

As illustrated in the detailed example of FIG. 2, the client 115 may include various modules within or associated with the map generator 120, including a database interface module 181 that operates to retrieve map data from the server 105 and map database 103. The map generator 120 further includes a map point identifier module 182 capable of identifying one or more points of interest that are to be used by a display module 184 to create a visual map display of received map data on the interface 134. The points of interest are communicated by the interface module 181 through the network interface 136 through network 125 to the server 105, which responds by sending pre-fetch map data from the map database 103 back to the client device 115, where this pre-fetch map data is received by the database interface module 181 and is stored in a map buffer memory 180 of the client 115. A map data selection module 186 accesses the stored pre-fetch map data and determines which portion of that buffered map data is to be provided to the display module 184 for creating the visual map display on the interface 134. The module 186, therefore, is responsive (after pre-fetching) to user interaction with the interface 134 to determine which portion of the pre-fetched map data should be displayed to the desires in response to a subsequent user interaction, which is determined by a centralized map position, user scrolling, and zoom level, for example.

In the illustrated embodiment, the map generator 120 further includes a tile budget module 188 that limits the amount of pre-fetch map data tiles that can be received to the client device. The client 115, for example, receives map data tiles at the database interface module 181, where upon receipt of one or any predetermined number of map data tiles the tile budget module 188 determines if the client device 115 has received a sufficient, or threshold amount of map data tiles, at which point the tile budget module 188 instructs the database interface module 181 to stop requesting and storing additional map data tiles.

While the tile budget module 188 is described as contained within the map generator 120, in other examples, a tile budget module may be stored in the server 105 or in both the client 115 and the server 105. The tile budget module 188, for example, may be implemented in the map generator 120 of the client 115 or implemented as a standalone or integrated module at the server 105. In some embodiments, the database interface module 181 receives zoom level data from a zoom level module 190, which identifies at what zoom level the module 181 is to request pre-fetch map data tiles. In this way, the client device 115 may receive pre-fetch map data at one or more zoom levels to store in the buffer memory 180.

Of course, some embodiments of the map generator 120 may have different and/or other modules than the ones described herein. Similarly, the functions described herein can be distributed among the modules in accordance with other embodiments in a different manner than that described herein.

Figure 3:
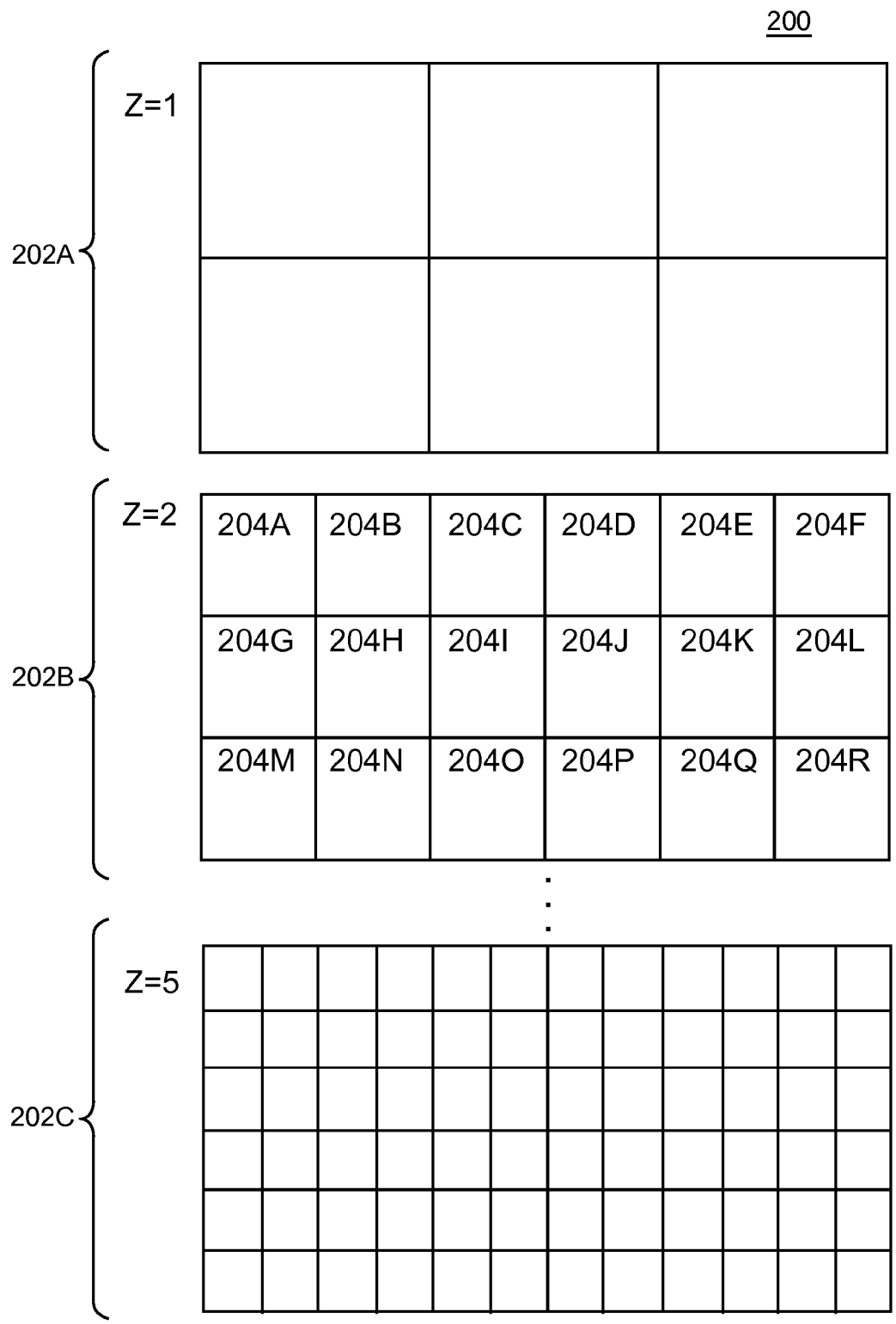
FIG. 3 illustrates a portion of the data structure for the map database of FIG. 1.

Generally speaking, map data in the map database 103 is stored in different zoom levels each formed of a plurality of map data blocks, termed map tiles, which are used to construct a visual display of the map. FIG. 3 illustrates an example data structure 200 of a portion of the map database 103. The map data is stored in numerous (n) different zoom level data structures (only three of which are shown) 202A, 202B, and 202C, where each data structure is formed by a plurality of map data tiles. The data structure 202B, which is the only one numbered for explanation purposes, shows the map data at zoom level, z=2, is formed of 18 map data tiles, 204A-204R. The map tiles represent the basic building blocks for constructing a map display. Each map tile contains necessary map data to construct a portion of the map display, including data identifying roads, buildings, and geographic boundaries, such as water lines, county lines, city boundaries, state lines, mountains, parks, etc. The map data may be stored in any number of different zoom level data structures. In an embodiment, 19 total zoom levels are stored in the map database 103.

The number of tiles at each zoom level increases, e.g., linearly, quadratically, exponentially, or otherwise. The zoom levels in the illustrated example (z=1, 2, and 5) have 6, 18, and 60 map data tiles, respectively, covering the same geographic area or region.

In some embodiments, each map tile contains map data stored in a bitmap format, for display to the user using a raster display engine executed by the display module 184. In other embodiments, the map tile may contain map data stored in vector format, for display using a vector buildup display engine executed by the display module 184. In either case, the display module 184 may employ a C++, HTML, XML, JAVA, or Visual Basic application for generating a visual display of the map tiles.

In the illustrated embodiment, all map data is stored in map tiles, and each map tile in a zoom level data structure is allocated the same memory allocation size. For example, each tile 204A-204R may be a bitmap image 10 Kbytes in size. This may be achieved, for example, by having each map tile cover the same sized geographic area. For map tiles containing vector data, the data size for each tile may vary, but each tile may still, in some embodiments, be allotted the same maximum memory space. Although not illustrated, in other embodiments, the data tiles will have different memory space allocations within a zoom level data structure.

Figure 4A:
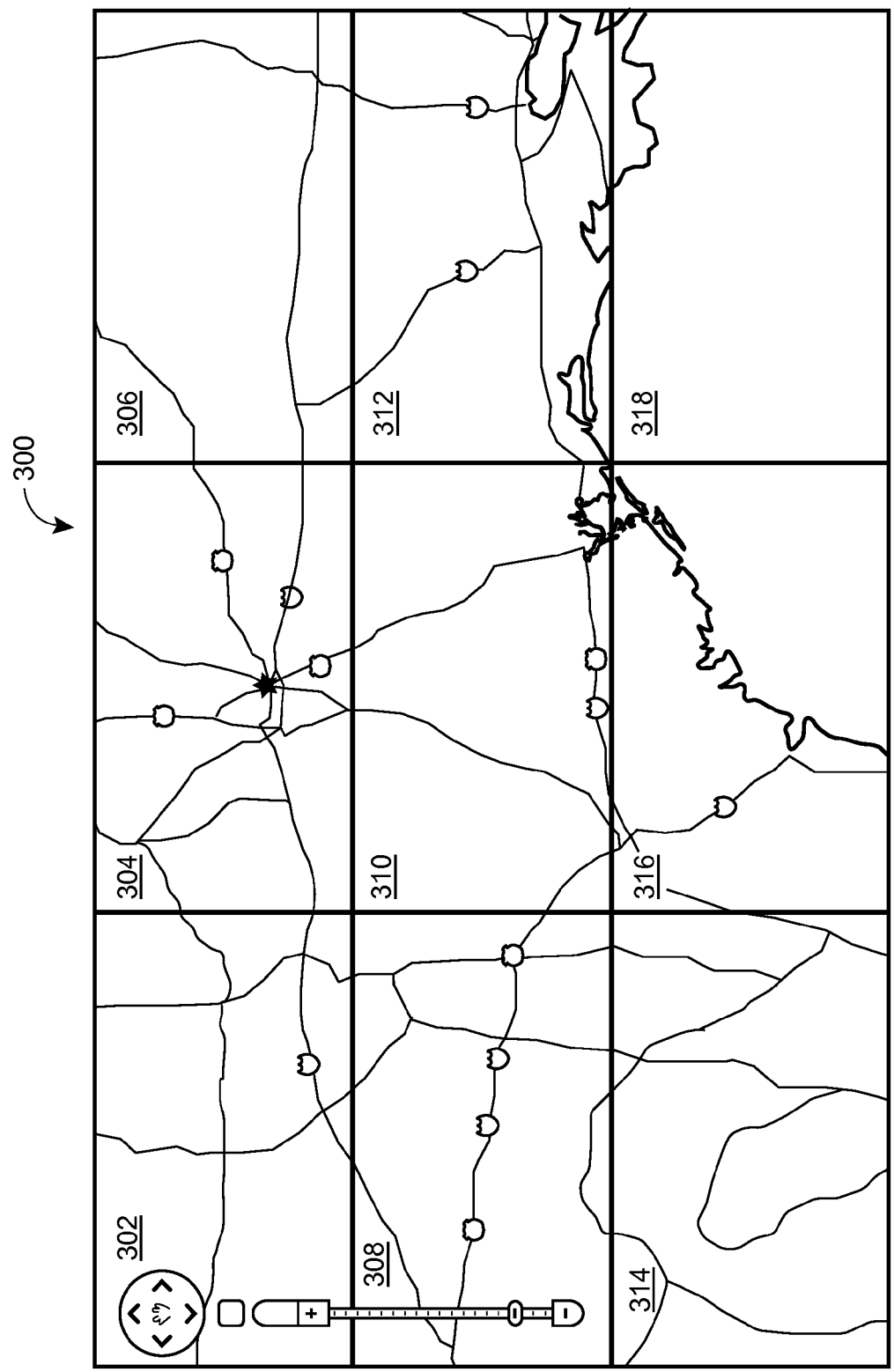
FIGS. 4A, 4B, and 4C illustrate example renditions of map data at three different zoom levels, respectively.
Figure 4B:
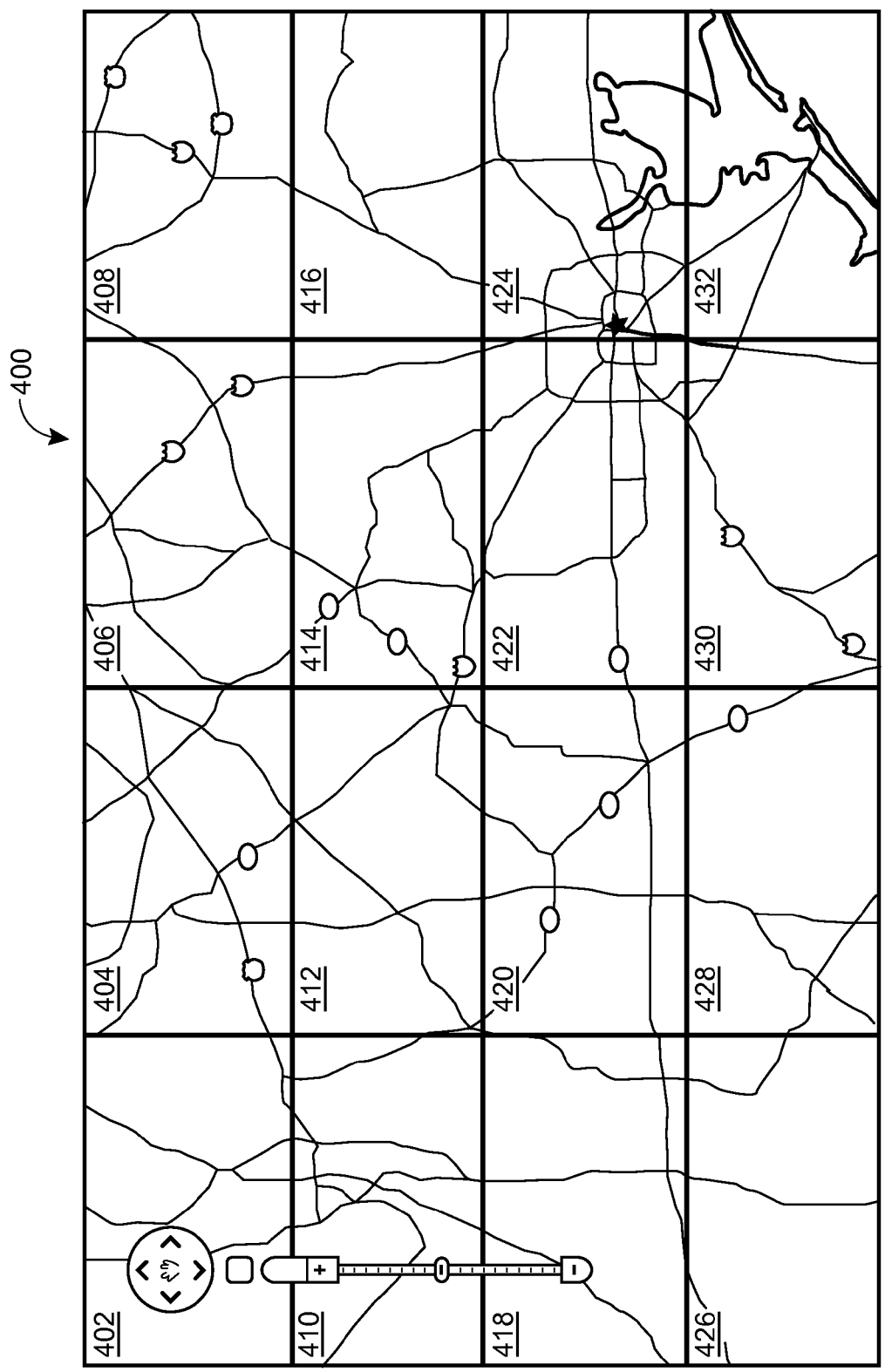
Figure 4C:
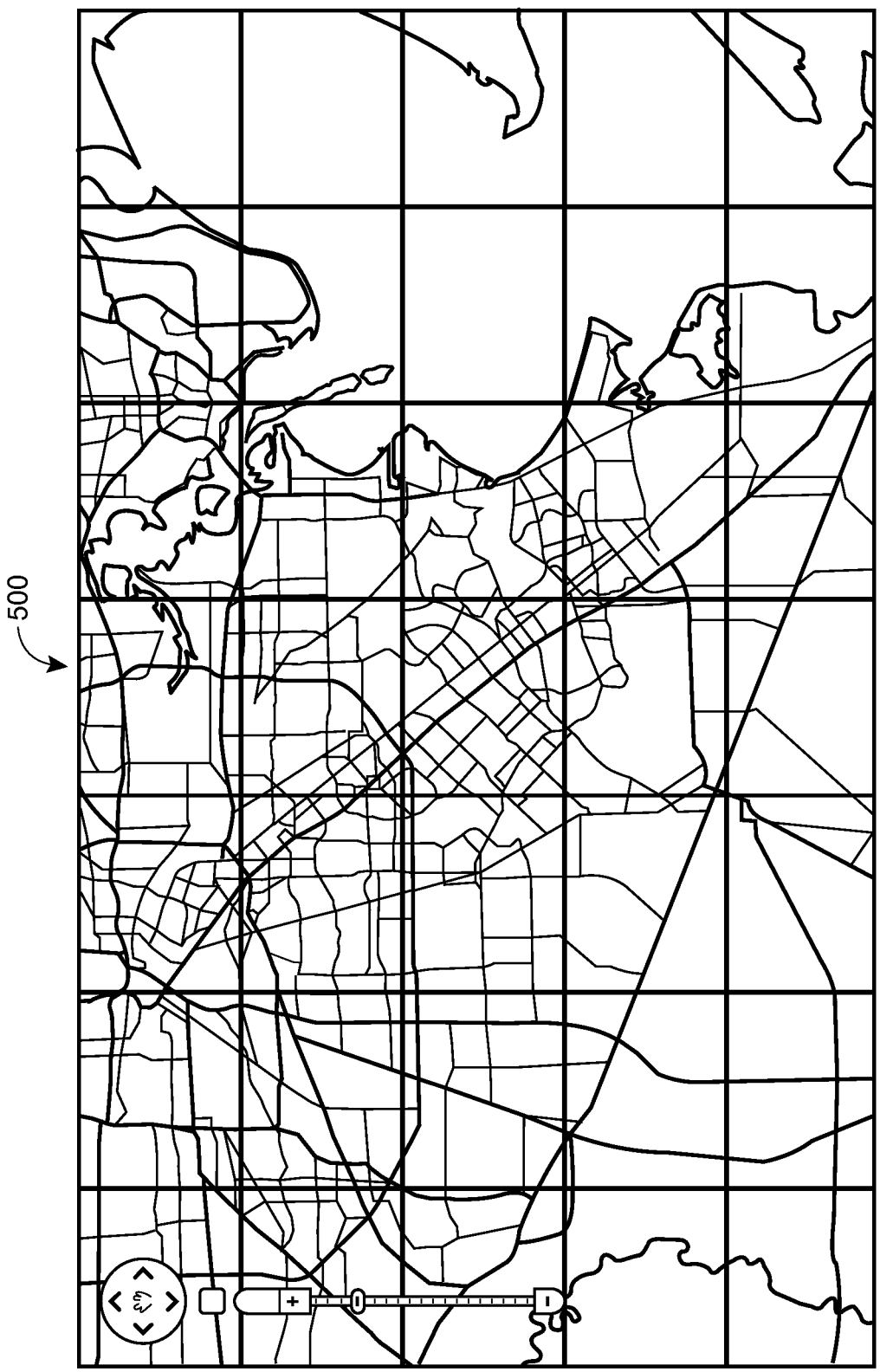

FIGS. 4A-4C illustrate visual map displays, e.g., that may be fully or partially displayed on the user interface 134, where each figure provides a visual display at a different zoom level. In the illustrated embodiments, FIG. 4A provides a visual map display 300 at an example zoom level, z=6, constructed of a series of map tiles 302-318, which cover the same size geographic area and which have the same amount of memory size.

In operation, the server 105 is able to transmit map data to respective clients 115 in chunks of data defined by these map tiles. For example, to transmit the map data needed to construct the map display 300, the server 105 may transmit each map tile in a frame, having a header portion providing identification data of the frame (such as geographic position, client device address, map tile version number, etc.) and a payload portion containing the specific map tile data to be used in forming the visual display. Map data tiles provide an effective mechanism for quantizing map data stored in the map database 103 and for quantizing communication of the map data over the network 125 to the clients 115.

In comparison to FIG. 4A, FIG. 4B illustrates a visual map display 400 at a zoom level higher than the zoom level of FIG. 4A, in this example zoom level, z=10. The map display 400 is formed of a plurality of map tiles 402-432. Like the map tiles 302-318, the map tiles 402-432 are each the same in size, e.g., covering the same geographic area and having the same memory size. FIG. 4C illustrates another visual map display 500 at a third even higher zoom level, zoom level z=12, formed of map data tiles.

Each of the displays 300, 400, and 500 is of a portion of the overall map data, which comprises many more map data tiles.

As illustrated across FIGS. 4A-4C, the map tiles that form each visual map display have various levels of detail. The tiles 302-318 illustrate geographic boundaries, but no roads, only highways and/or interstates, while the tiles of FIG. 4C are at a higher zoom level and contain information on roads, buildings, parks, end points, etc.

As the zoom levels increase, i.e., as the visual map display focuses down on a smaller geographic region, the amount of map data may reach a maximum point, beyond which all zoom levels will contain the same map data. The number of map tiles needed to construct a map display may vary but the total amount of map data becomes saturated. The zoom level corresponding to this point is termed the saturation zoom level and represents the zoom level at which all roads, building, parks, end points, and other map data elements for a geographic region are provided. Any additional zoom levels selected by the user merely zoom in further on these map data elements. In the illustrated example of FIGS. 4A-4C, zoom level, z=12, represents the saturation zoom level.

While a user interacts with the visual map displays 300, 400, and 500, the user may wish to scroll around to display other map data near the illustrated map data. Therefore, the client device 115 uses a system to fetch and store a sufficient amount of map data to form the visual map display while buffering additional map data at the local device 115 to allow efficient user interaction with that display.

Figure 5:
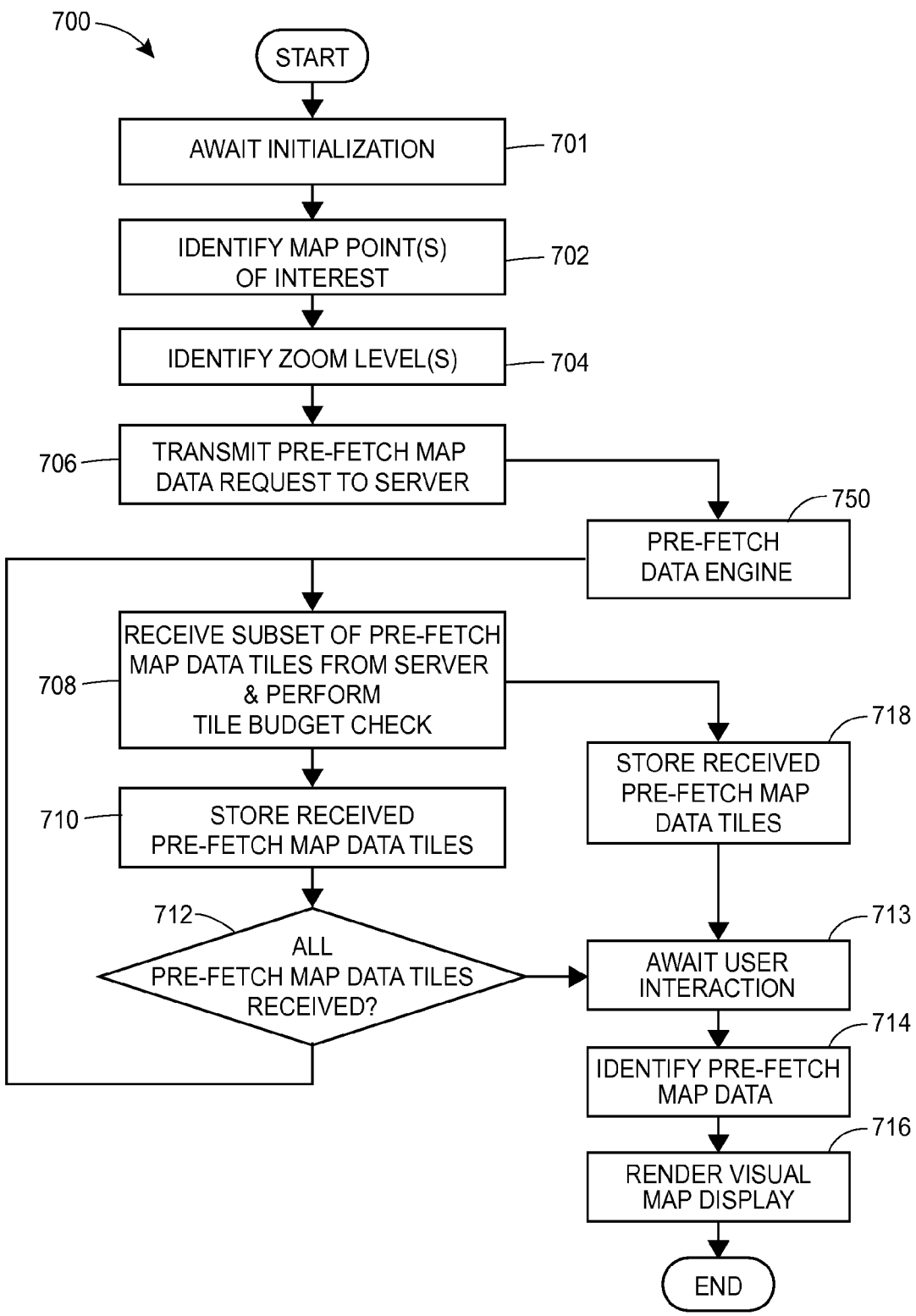
FIG. 5 illustrates an example process or flow diagram for identifying points of interest and map zoom levels that are used in requesting pre-fetch map data from a server and for performing a tile budget on the pre-fetch map data from the server.

FIG. 5 illustrates a routine or process 700 for requesting and receiving map data tiles from a remote server. At a block 701, the routine or process 700 awaits initiation, which may result from user action, such as a user activating a mapping application on the client device 115. Initiation may also result from user or application initiated searches, direction end points, and stored location accesses by a user or application. In some embodiments, the block 701 functions to automatically initiate the routine or process 700, for example, by periodically initiating pre-fetching map data. The block 701 may be designed to initiate the process every hour, every day, a few times a day, or at any other suitable periodic interval. In some embodiments, that automatic initiation can occur in response to an event unbeknownst to the user of the client device, such as when mobile wireless services are initially activated on the client device or when the client device enters an entirely new geographic region, such as when a user has traveled to a city location.

At a block 702, the map point identification module 182 automatically (i.e., without user interaction or initiation) determines one or more map points of interest to display to a user via the interface 134. The module 182 may automatically identify points of interest, for example, by determining a GPS position of the current location of the client 115, by determining most recently searched points of interest, by accessing a database of stored points of interest, or by determining the most recently visited points of interest (e.g., cities, neighborhoods, etc.). Of course, in some of these cases, the module 182 may determine locations for which to download map data for storage at the user device as a background application and thus without any particular user interaction. An example further implementation of the module 182 and the block 702 is described in the routine or process of FIG. 8.

In other examples, the module 182 may manually determine the points of interest based on previous user input, for example, through the user providing an address into a data field presented on the interface 134, or through the user selecting to find a point of interest obtained through interaction with the interface 134 more generally. For example, the user can access a web-browser or other program running on the client device that identifies a location, business, home, etc., from which the module 182 may allow the user to select such item for building a map display of the vicinity around such point of interest. Any suitable manual method for entering or otherwise identifying one or more points of interest may be used by module 182 and collected by the block 702. Further still, these manual methods can be modified into automatic methods of map point identification, by having the block 702 access historical data on previous, manual user data inputs.

Figure 6A:
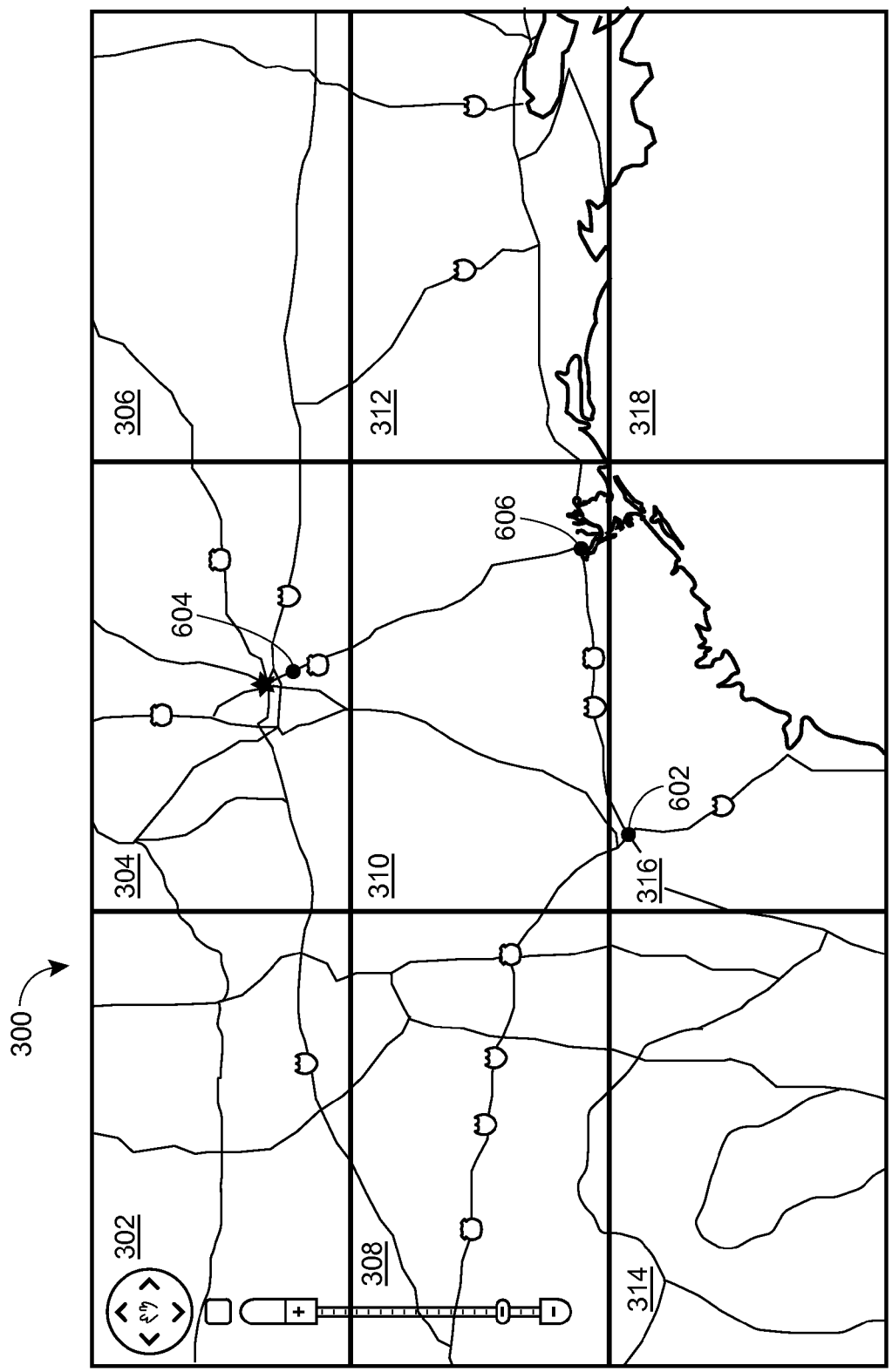
FIGS. 6A, 6B, and 6C illustrate example renditions of the map data of FIGS. 4A, 4B, and 4C, at three different zoom levels, respectively, and showing points of interest at the different zoom levels.
Figure 6B:
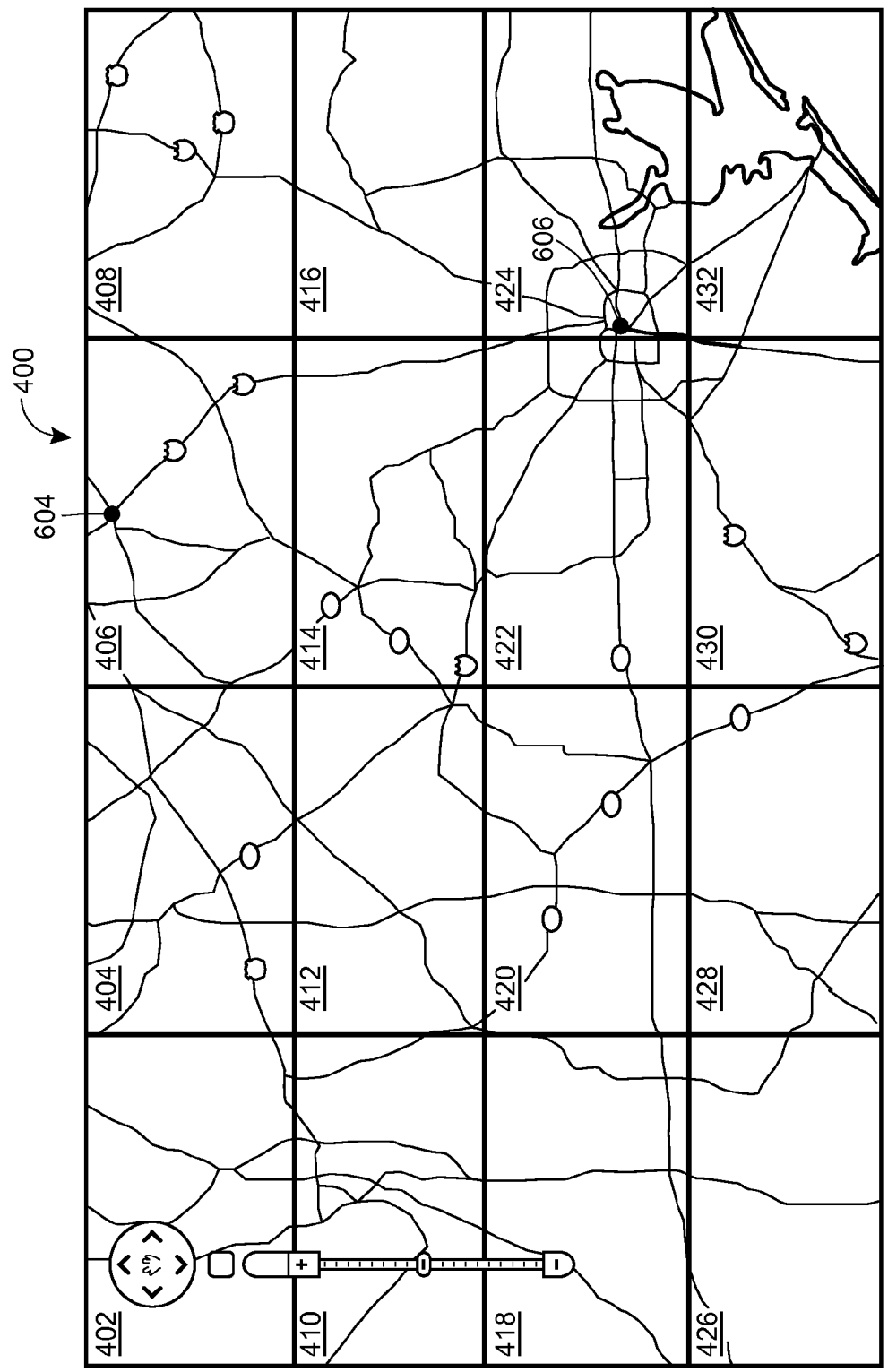
Figure 6C:
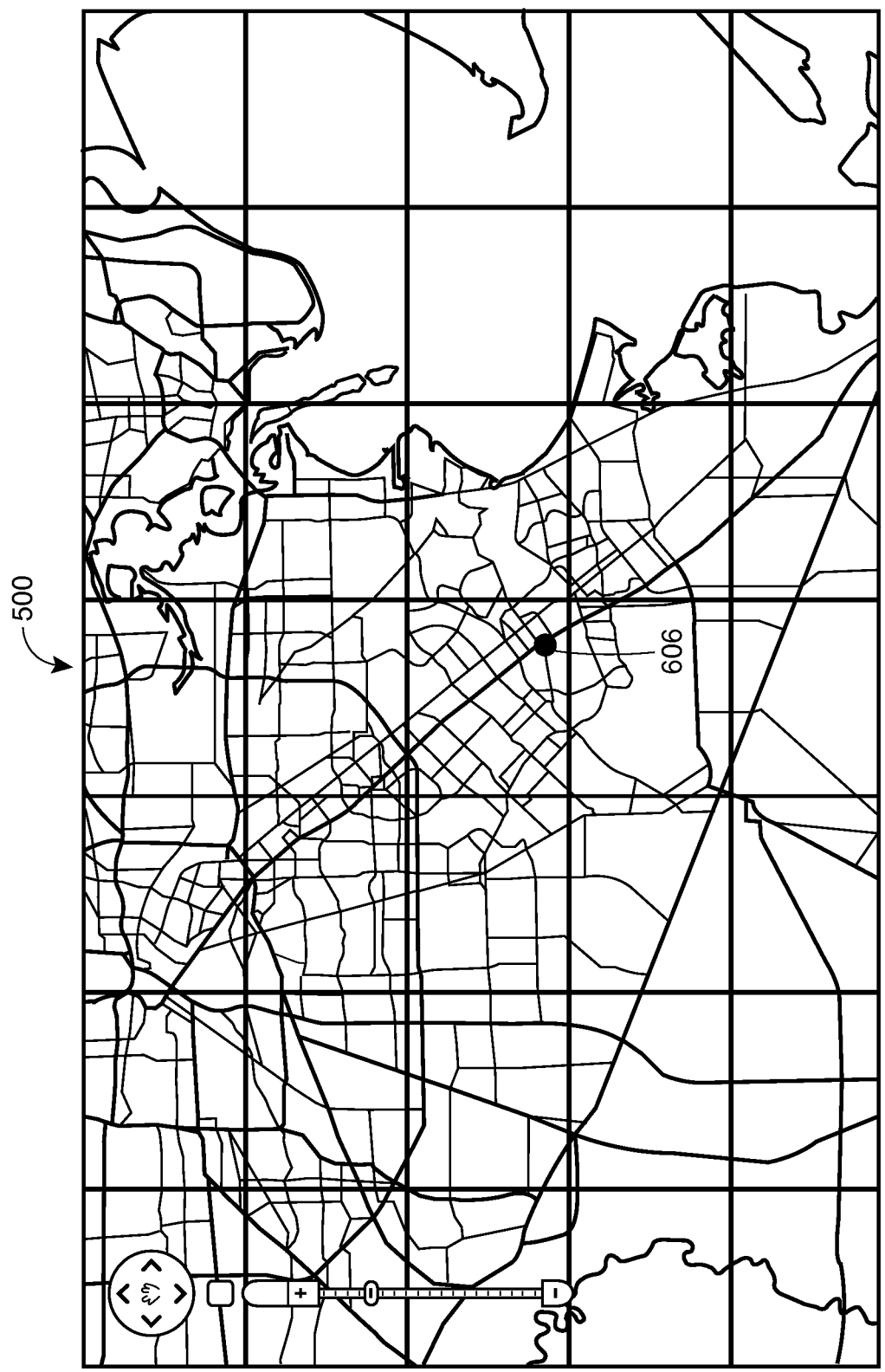

FIGS. 6A-6C illustrate the visual map displays (300, 400, and 500) of FIGS. 4A-4C, respectively, but showing map points of interest identified by the module 182. The points of interest that are displayed on the user interface 134 depending on the zoom level. FIG. 6A illustrates three points of interest 602, 604, and 606; while FIG. 6B illustrates only two points of interest 604 and 606; and FIG. 6C illustrates only one point of interest 606.

For convenience purposes the remainder of the routine or process 700 will be described in terms of a single map point of interest being identified by the block 702. It will be understood, that the same blocks would be executed if multiple map points of interest were identified.

Returning to FIG. 5, at a block 704, one or more desired zoom levels are identified (by map zoom module 190). If the routine or process 700 is initiated by the user interacting with a mapping application, the zoom level module 190 may identify a zoom level based on the zoom level selected by the user. In other embodiments, the zoom level module 190 may identify the most recently last used zoom level by the user or the most frequently used zoom level as the identified zoom level.

At a block 706, the database interface module 181 communicates the map points of interest (block 702) and the zoom level data (block 704) to the server 105, in particular, in the illustrated embodiment, to a pre-fetch data engine 750 at the server 105 (see, FIG. 1). The pre-fetch data engine 750 then identifies the one or more map points of interest and zoom level(s) and determines the map data corresponding to the one or more points of interest at the selected one or more zoom levels that are to be fetched from the map database 103. The engine 750 collects the corresponding map tiles and begins transmitting that map data to the map generator 120.

In the illustrated embodiment, the block 706 requests pre-fetch map data for all map points of interest at one time, for example, by sending to the server a data frame having an identification header that contains, among other things, an identification field identifying the client device and having a payload that identifies the one or more map points of interest and the zoom level or zoom levels for which to collect map data. The map points of interest may be identified by a longitude and latitude coordinate, in some embodiments. Optionally, in some embodiments where the block 706 requests all pre-fetch map data at once, the server 105 may send the responsive pre-fetch map data tiles in subsets, i.e., in blocks of one or more map data tiles, but not in a continuous stream. As each subset of the pre-fetch map data tiles is received, the block 706 may send a return signal, in the form of an "acknowledgment" signal, back to the server 105 to confirm receipt of the data.

As the map data tiles are received at a block 708, the tile budget module 188 performs a tile budget check on the received map data tiles to determine if a tile budget has been met. If the tile budget has not been met, then the client device 115 stores that pre-fetch map data through a block 710 (database interface module 181), in the memory buffer 190. At a block 712, the routine or process 700 determines whether all pre-fetch map data tiles have been received to the client device 115. If not, then control is passed to block 708 to receive further map data tiles and perform tile budget checks. Optionally in some embodiments control is passed to the block 706, which transmits a "continuing request" signal that instructs to the server 115 to send the next subset of pre-fetch map data tiles. If there are no further map data tiles to received from the server, the routine or process 700 passes control to a block 713, where the client device 115 awaits some user interaction, i.e., a subsequent interaction after the pre-fetching of blocks 701-710. Once as user as performed an interaction that is to result in rendering (i.e., construction and display) of a visual map display, through a block 714, the module 186 identifies a subset of the previously-stored pre-fetch map data to display to the user on a visual display that is rendered by the display module 184 through a block 716.

If the tile budget check at the block 708 identifies that a tile budget will be met by the received map data tile(s), the received map data tile(s) will be stored, if memory allows, by a block 718, and control is passed to the block 713. This step prevents further map data tiles from being received and stored on the client device 115. Optionally, in some embodiments, upon a tile budget being met, the block 706 is instructed to transmit a "stop" instruction signal to the server, which the server then interprets and stops from sending any further map data tiles.

Figure 7:
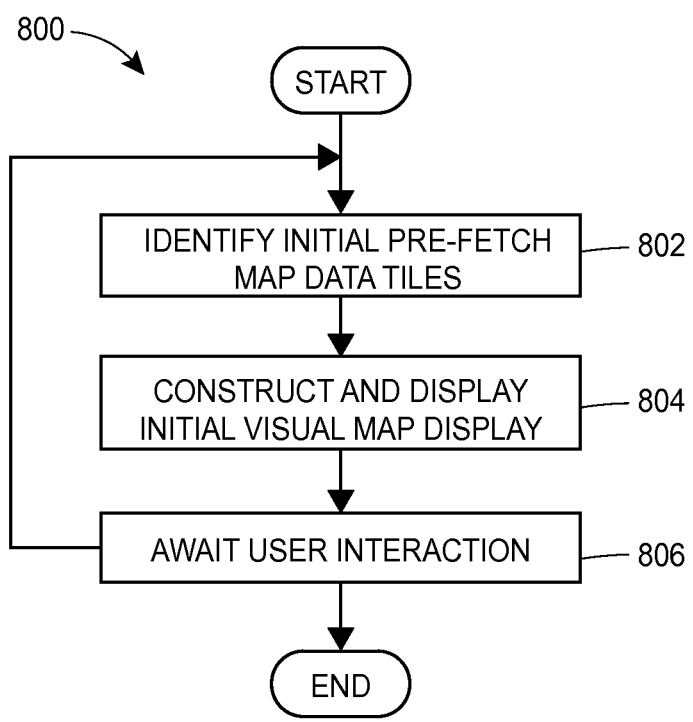
FIG. 7 illustrates an example process or flow diagram for constructing and displaying pre-fetch map data visually.

FIG. 7 illustrates a routine or process 800 that may be performed by the blocks 714-716 (display module 184), i.e., in response to a user request for map data occurring after the pre-fetch map data has been automatically collected and stored. The client device 115 maintains all received pre-fetch map data from the server 105 in the memory buffer 180. At a block 802, the display module 184 identifies an initial subset of the pre-fetch map data and, at a block 804, constructs and displays on the user interface 134 a visual map display of this initial subset of the pre-fetch map data, including one or more map points of interest. The initial display is provided to visualize the map points of interest. The display is an initial display in that the client device will have likely received and stored a large number of map data tiles, too many to display at any given time, irrespective of zoom level; therefore only a subset of the map data tiles are displayed at one time. At a block 806, the display module 184 detects further user interactions with the interface 134, waiting for the user to interact with the visual display of map data as the user selects different regions of the map data that are to be displayed. For example, at the block 806, the display module 184 detects a user scrolling across the displayed map data to depict adjacent map data to the initial point of interest. Such scrolling may be sideways across the display, up or down, or any other desired direction. The user may also choose to alter the map by changing zoom levels, either increasing to zoom in further on the map data or decreasing to zoom further out. The block 806 identifies map manipulation user interaction data to the block 802, which then determines which other pre-fetched map data, stored in the buffer memory 180, is to be displayed in response to the user interaction. Or the block 806, upon appropriate instruction from the user, terminates the routine or process 800 entirely, for example, when a user selects to exit a mapping application.

Figure 8:
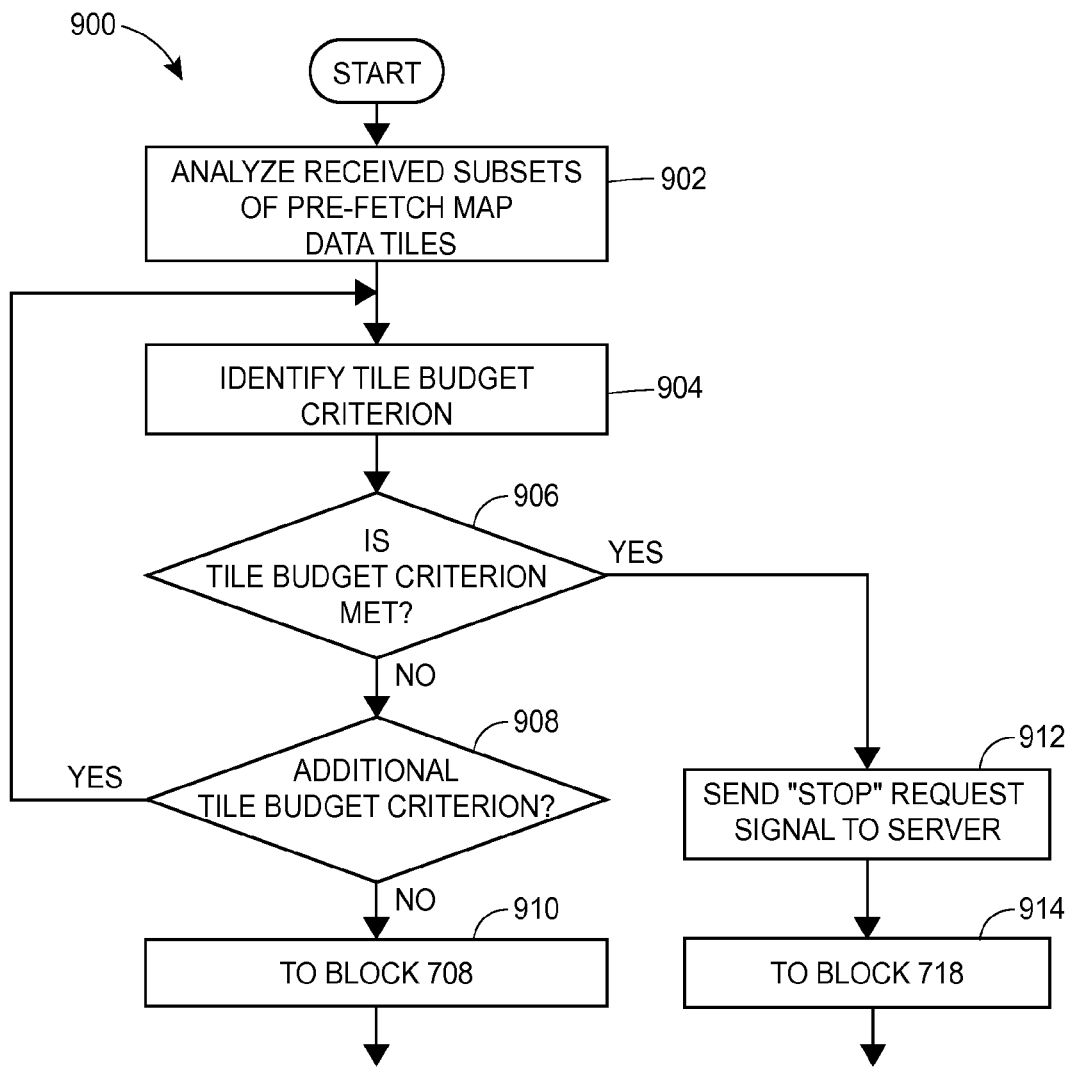
FIG. 8 illustrates an example process or flow diagram for performing the tile budgeting of FIG. 5.

FIG. 8 illustrates a routine or process 900 that may be implemented by the block 708 (the tile budget module 188). A process 902 analyzes the subset of pre-fetch map data tiles received from the server 105, where in the illustrated example such analysis includes incrementing a total number of map data tiles received and determining a total amount of map data (measured in kilobytes, megabytes, or gigabytes) received from the server 105. At a block 904, the tile budget module 188 identifies a first tile budget criterion. The map generator 120 may use any number of tile budget criteria. The illustrated example is described with respect to two tile budget criteria: a total number of received map data tiles and a total amount of map data. The module 188 initially identifies the total number of received map data tiles, in the discussed embodiment. At a block 906, the tile budget module 188 determines if the tile budget has been met by the received subset of pre-fetch map data tiles, i.e., whether the number of received map data tiles exceeds a threshold number of data tiles stored in the memory 132 of the client device 115. If the first tile budget criterion is not met, a block 908 determines if there are additional tile budget criteria. If there are, control is passed back to the block 904, where the tile budget module 188 identifies the next tile budget criterion and the steps repeat. Once there are no further tile budget criterion, at a block 910 control is passed back to block 708.

Upon the various tile budget criteria checks of block 906, if the module 188 determines that the tile budget has been met, at a block 912, a "stop" instruction is sent to the server 115 (the database interface module 181) to instruct the server to stop sending any additional pre-fetching map data tiles. The block 914 instructs that control be passed to the block 714 for storing the received pre-fetch map data tiles, if there is sufficient memory for storing the tiles. If there is not, the received pre-fetch map data tiles exceeding the tile budget are discarded.

Figure 9:
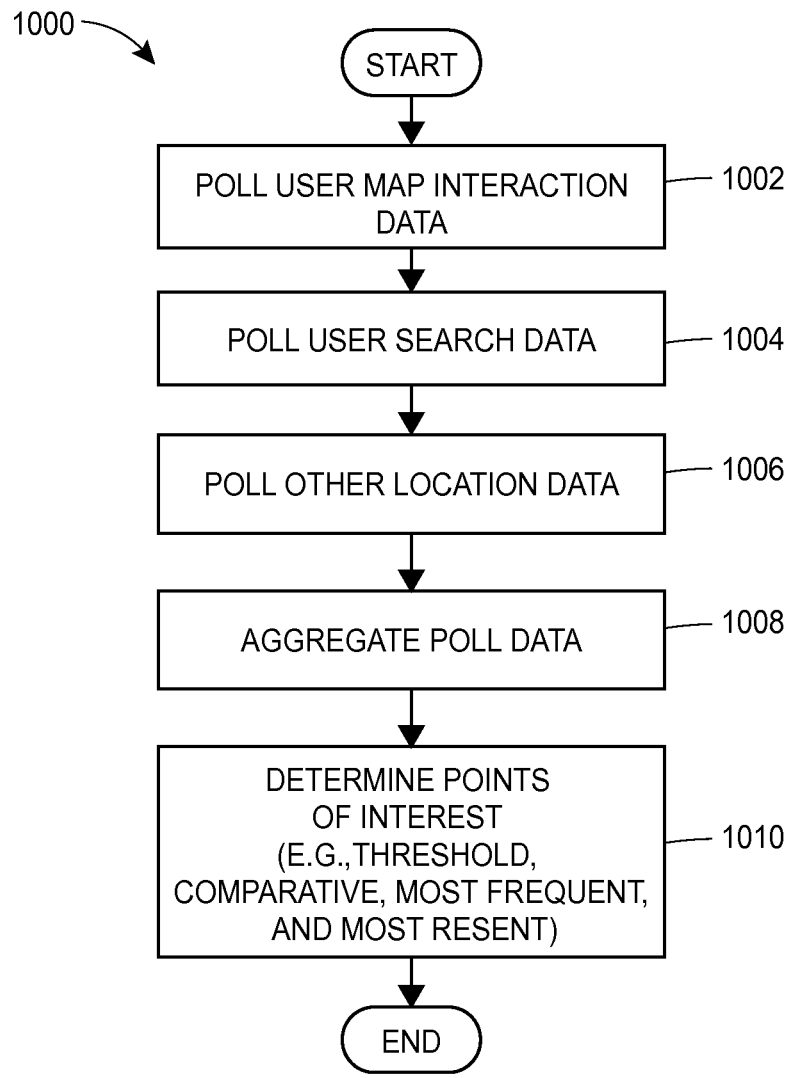
FIG. 9 illustrates an example process or flow diagram for determining points of interest to be used in identifying the pre-fetch map data.

FIG. 9 illustrates a routine or process 1000 for automatically (prior to user interaction or initiation) determining points of interest as may be used by block 702. The map point identifier module 182 performs a series of data polling operations, accessing data stored in the memory 132 to aggregate one or more potential points of interest. At a block 1002, the module 182 polls current user interaction data or stored user map interaction data, such as data on past user interactions with map data displayed on the interface 134, including data such as locations highlighted by the user, map points placed on a map display by the user, and geographic regions most displayed on a map display, for example. At a block 1004, the module 182 polls data on user searches, identifying locations the user has requested be identified on a map display. At a block 1006, the module 182 polls any other location data, including current geographic position and stored geographic position. The latter includes can data such as tracking geographic position of the client device 115 to automatically determine location patterns. For example, the module 182 may collect data on client device locations during workweek, Monday-Friday, and use that data for pre-fetching map data develop travel patterns of the client device. The module 182 may collect different data to determine different typical travel patterns, and thus different potential points of interest, during the weekend. It is noted that these examples are described in terms of points of interest, but as used herein, a point of interest represents a particular point on a map or any region of a map that can be defined (specifically or even generally) by a map point.

At a block 1008, the module 182 aggregates the polled potential points of interest data and provides this data to a block 1010 which determines a set of one or more points of interest to be used by block 704 to determine the corresponding one or more tile radii. The block 1010 may determine the points of interest by using a threshold, for example, identifying any points of interest that have been accessed by the user a certain number of times or a certain percentage of time over a given period of time. The block 1010 may determine the points of interest comparatively, for example, by determining which points of interest are the most frequently accessed. The block 1010 may make the determination based on which points of interest are most recently accessed.

Figure 10:
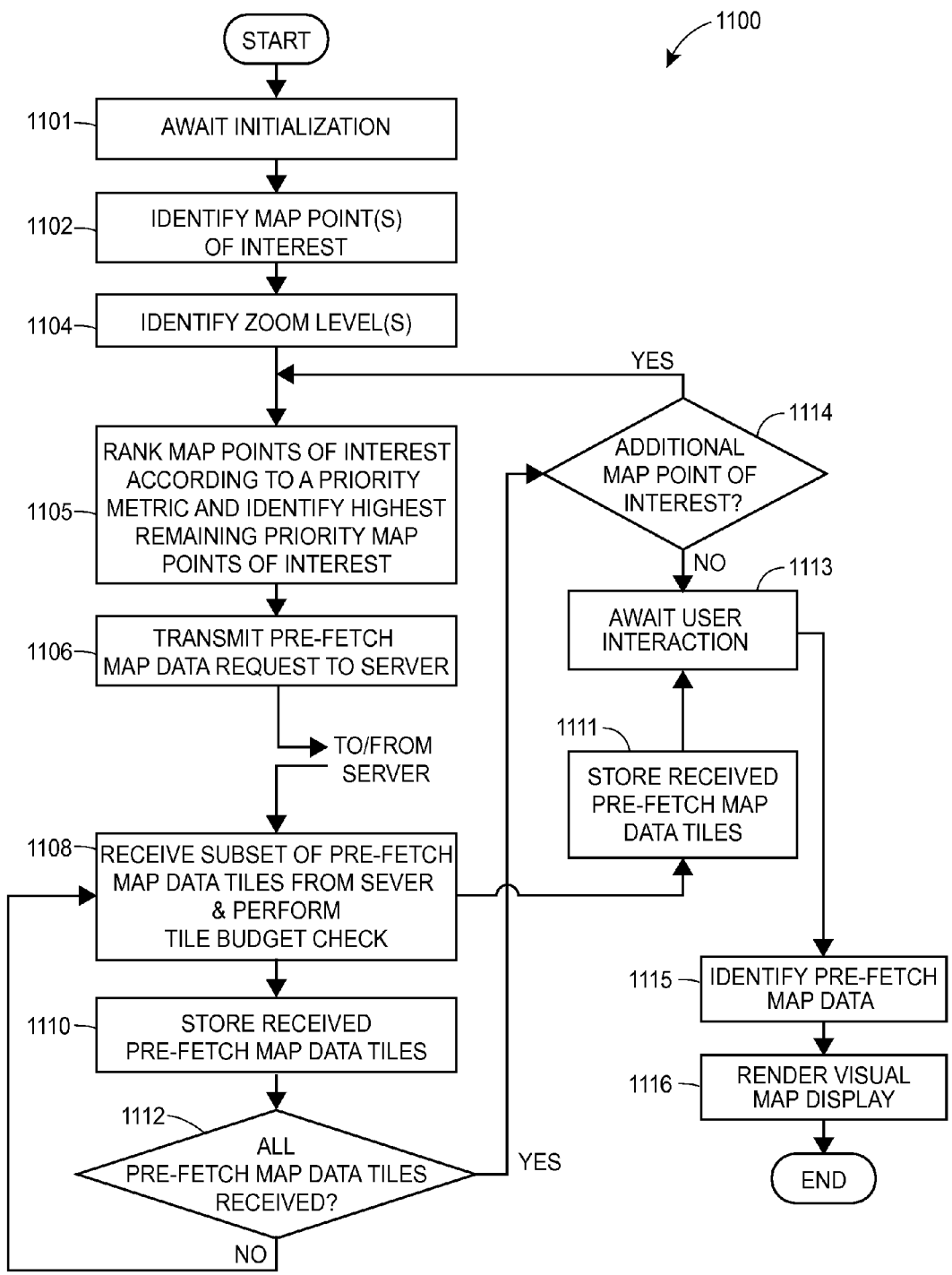
FIG. 10 illustrates an example process or flow diagram similar to that of FIG. 5, but which ranks points of interest in priority as part of a pre-fetching map data process.

FIG. 10 illustrates a routine or process 1100 similar to that of FIG. 5, but in which a plurality of map points are identified and ranked in a priority order that is used to determine the order in which the client device 115 requests pre-fetch map data from the server 105. At a block 1101, the routine or process 1100 awaits initiation, in a similar manner to that of block 701 in FIG. 5. At a block 1102, the module 182 identifies a plurality of map points of interest, for example, performing similar operations to that of block 702 described above, namely, determining the map points of interest based on manual input from and/or automatically identifying map points of interest, from a current location of the client 115, most recently searched points of interest, stored points of interest, and/or most recently visited points of interest. At a block 1104, the module 180 identifies a desired zoom level or zoom levels for each of the map points of interest.

At a block 1105, the map point identifier module 182 performs a prioritization on the identified map points of interest, ranking them in order of priority from a highest to a lowest. The block 1105 then identifies a highest priority map point of interest, which a block 1106 (module 181) identifies to the remote server 105, more specifically to a pre-fetch data engine (not shown). A block 1108 performs tile budget checking, similar to that of the block 708 described above, while a block 1110 stores the received pre-fetch map data tiles if the tile budget has not been met. If the tile budget has been met, then a block 1111 stores the received pre-fetch map data tiles, if possible, and passes control to a block 1113, where the client device awaits user interaction like block 713 of FIG. 5, after which at a block 1115, the module 186 identifies tiles among the stored pre-fetch map data tiles that are to be used by module 184 (block 1116) for rendering a visual display of the map data.

At a block 1112, the routine or process 1100 determines whether there are additional pre-fetch map data tiles corresponding to the highest priority map point of interest. If so, control is passed back to block 1108 for receiving additional subsets of the pre-fetch map data tiles and performing tile budget checking or optionally block 1106. These additional pre-fetch map data tiles may be those of different zoom levels for the highest priority map point of interest, data tiles associated with areas around or adjacent to the highest priority map point of interest, etc. If not, then all pre-fetch map data tiles for the first map point of interest have been received and stored, and the routine or process 1100 passes control to a block 1114 which determines if there is at least one additional map point of interest. If so, control is passed to the block 1105 which identifies the next highest priority map point of interest and communicates the same to the block 1106 which then requests pre-fetch map data tiles corresponding to that next highest priority map point of interest. This process continues until pre-fetch map data tiles for all map points of interest have been downloaded or until the tile budget has been met. If there are no additional map points of interest, the block 1114 passes control to the block 1113.

Figure 11:
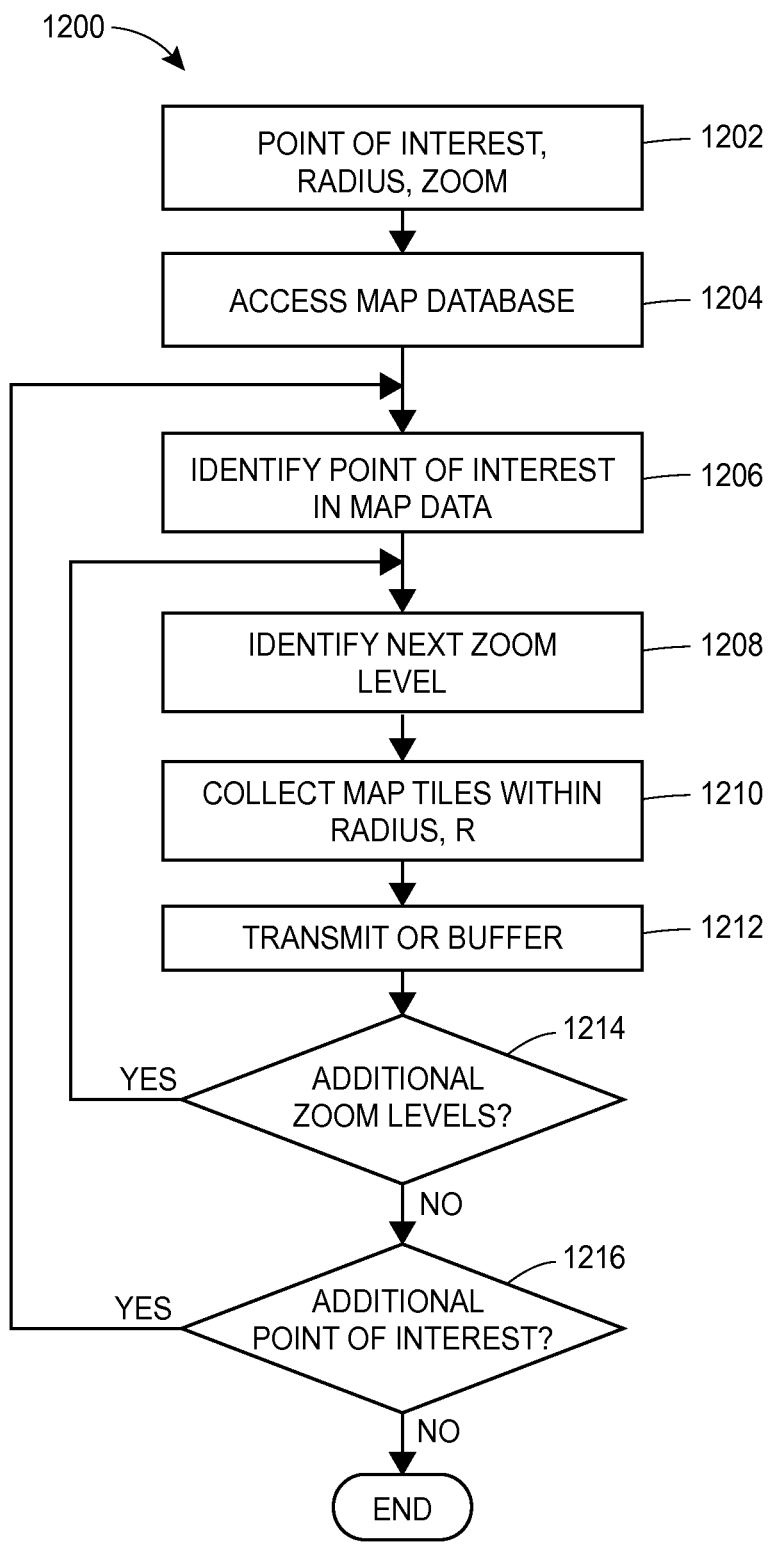
FIG. 11 illustrates an example process or flow diagram for identifying the pre-fetch map data in response to the identified points of interest, zoom levels, and tile radii.

FIG. 11 illustrates an example routine or process 1200 as may be performed by the server 105, specifically the pre-fetch data engine 750, upon receipt of the identified points of interest and zoom levels at a block 1202. At a block 1204, the server 105 accesses the map database 103, and takes one of the points of interest and identifies the map data corresponding to that point of interest, at a block 1206. A block 1208 identifies a zoom level, e.g., from the zoom level received to block 1202, at which to collect the initial set of map data from the database 103. For the identified zoom level, a block 1210 identifies the first point of interest collects all map data tiles the correspond to the point of interest, which thereby identifies the pre-fetch map data associated with that point of interest. For example, if each tile in the map data is stored with an assigned position value relative to the other tiles, such as an assigned longitude value and an assigned latitude value or an assigned column value and an assigned row value, then the block 1210 may identify a pre-determined set of map data tiles adjacent the map data tile containing the point of interest.

At a block 1212, the server 105 transmits a subset of the identified pre-fetch map data tiles collected at block 1210 to the requesting client device 115, where the requesting client device 115 is identified by address information in a header of the data provided to block 1202. The server sends a subset of the pre-fetch map data tiles, which allows the client device 115 to frequently perform tile budgeting checks on the received data. The subset includes at least one pre-fetch map data tile; and the smaller the subset the more frequently the client device 115 will check for whether the tile budget has been reached.

In the illustrated embodiment, at a block 1214, the server 105 determines if the client device has identified a need for map data stored at additional zoom levels, where if so, control is passed back to the block 1208 which identifies the next zoom level and the process repeats, as described. In some embodiments, the client device 115 (i.e., the database interface module 181 via block 706), sends requests for pre-fetch map data on a per point of interest basis, i.e., awaiting receipt of all pre-fetch map data tiles for one point of interest, before identifying the next point of interest to the server 105. In other embodiments, the client device 115 (again through block 706) requests pre-fetch map data for a plurality of map points of interest at one time. In the case of the later, if no additional zoom level data is required for the particular point of interest, then a block 1216 determines if additional points of interest have been identified by the client device, where if so, control is passed back to the block 1206 which identifies the next point of interest and the process repeats, as described. If not the routine or process 1200 ends.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 125 may include but is not limited to any combination of a LAN, a MAN, a WAN, a mobile, a wired or wireless network, a private network, or a virtual private network. Moreover, while only three clients 115 are illustrated in FIG. 1 to simplify and clarify the description, it is understood that any number of client computers are supported and can be in communication with the server 105.

Additionally, certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map editor system for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system and a process for identifying terminal road segments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
   identifying, on a client device, one or more map points of interest;
   identifying, based on the map points of interest, pre-fetch map data tiles to be requested from a hardware server communicatively coupled to a remote map database and stored on the client device for eventual rendering of a visual display of map data in response to a subsequent user request, wherein each pre-fetch map data tile includes vector data for the client device to construct a portion of a map for display at a single zoom level;
   determining, at the client device, a tile budget for storing the pre-fetch map data tiles at the client device;
   prioritizing, at the client device, a plurality of the map points of interest in an order from highest to lowest based on prior access of the plurality of the map points of interest by the client device;
   requesting, from the hardware server communicatively coupled to the remote map database storing the map data, the pre-fetch map data tiles corresponding to the plurality of the map points of interest in order from highest to lowest priority corresponding to one or more map points of interest;
   receiving, at the client device, a subset of the pre-fetch map data tiles from the hardware server communicatively coupled to the remote map database in order from highest to lowest priority; and,
   during receiving of the pre-fetch map data tiles at the client device, determining, at the client device, if the tile budget has been met by the received pre-fetch map data tiles, where,
   if the tile budget has been met by the received subset of the pre-fetch map data tiles, the client device stops receiving additional pre-fetch map data tiles from the map database, and
   if the tile budget has not been met, the client device sends a signal to the hardware server communicatively coupled to the remote map database to send a next subset of the pre-fetch map data tiles;
   wherein the subset of the pre-fetch map data tiles includes a higher priority than the next subset of the pre-fetch map data tiles and the client device continues receiving additional, prioritized subsets of the pre-fetch map data tiles from the hardware server communicatively coupled to the remote map database until the tile budget is met or until all pre-fetch map data tiles corresponding to the one or more map points of interest have been received at the client device; and
   storing the received pre-fetch map data tiles in a local memory on the client device until a subsequent user request.

2. The method of claim 1, wherein the tile budget is a preset total number of map data tiles that are to be received at the client device.

3. The method of claim 1, wherein the tile budget is a preset total amount of map data that is to be received at the client device.

4. The method of claim 1, the method comprising:
   receiving, at the client device, the pre-fetch map data tiles in a sequential manner; and
   in response to receiving each pre-fetch map data tile, determining, at the client device, if the tile budget has been met.

5. The method of claim 4, wherein prioritizing, at the client device,
   the plurality of map points of interest based on user usage data.

6. The method of claim 5, wherein prioritizing, at the client device, the plurality of the map points of interest in an order from highest to lowest based on prior access of the plurality of the map points of interest by the client device further includes prioritizing the plurality of map points of interest based on which map points of interest were most recently accessed.

7. The method of claim 5, wherein prioritizing, at the client device, the plurality of the map points of interest in an order from highest to lowest based on prior access of the plurality of the map points of interest by the client device further includes prioritizing the plurality of map points of interest based on which map points of interest were most frequently accessed.

8. The method of claim 1, wherein prioritizing, at the client device, the plurality of the map points of interest in an order from highest to lowest based on prior access of the plurality of the map points of interest by the client device further includes prioritizing the plurality of map points of interest based on an amount of time a map point of interest was displayed on a previously rendered visual display of map data.

9. The method of claim 1, wherein prioritizing, at the client device, the plurality of the map points of interest in an order from highest to lowest based on prior access of the plurality of the map points of interest by the client device further includes prioritizing the plurality of map points of interest based on a previous user selection.

10. The method of claim 1, further comprising
    identifying, from a plurality of zoom levels, one or more zoom levels, such that the pre-fetch map data tiles are identified based on the one or more map points of interest and the identified one or more zoom levels.

11. The method of claim 10, wherein the map data at each zoom level is stored in map data tiles having a same memory allocation size.

12. A non-transitory computer-readable medium storing instructions, the instructions when executed by a processor cause the processor to:
    identify, on a client device, one or more map points of interest;
    identify, based on the map points of interest, pre-fetch map data tiles to be requested from a hardware server communicatively coupled to a remote map database and stored on the client device for eventual rendering of a visual display of map data in response to a subsequent user request, wherein each pre-fetch map data tile includes vector data for the client device to construct a portion of a map for display at a single zoom level;

determine, at the client device, a tile budget for storing the pre-fetch map data tiles at the client device;

prioritize, at the client device, a plurality of the map points of interest in an order from highest to lowest based on prior access of the plurality of the map points of interest by the client device;

request, from the hardware server communicatively coupled to the remote map database storing the map data, the pre-fetch map data tiles in order from highest to lowest priority corresponding to one or more map points of interest;

receive, at the client device, a subset of the pre-fetch map data tiles from the hardware server communicatively coupled to the remote map database; and, during receiving of the subset of the pre-fetch map data tiles at the client device, determining, at the client device, if the tile budget has been met by the received subset of the pre-fetch map data tiles, where, if the tile budget has been met by the received subset of the pre-fetch map data tiles, the client device stops receiving additional pre-fetch map data tiles from the map database, and if the tile budget has not been met, the client device sends a signal to the hardware server communicatively coupled to the remote map database to send a next subset of the pre-fetch map data tiles;

wherein the subset of the pre-fetch map data tiles includes a higher priority than the next subset of the of the pre-fetch map data tiles and the client device continues receiving additional, prioritized subsets of the pre-fetch map data tiles from the hardware server communicatively coupled to the remote map database until the tile budget is met or until all pre-fetch map data tiles corresponding to the one or more map points of interest have been received at the client device; and store the received pre-fetch map data tiles in a local memory on the client device until a subsequent user request.

13. The non-transitory computer-readable medium storing instructions of claim 12, wherein the tile budget is a preset total number of map data tiles that are to be received at the client device.

14. The non-transitory computer-readable medium storing instructions of claim 12, wherein the tile budget is a preset total amount of map data that is to be received at the client device.

15. The non-transitory computer-readable medium storing instructions of claim 12, wherein the instructions, when executed by a processor, cause the processor to:

receive, at the client device, pre-fetch map data tiles in a sequential manner; and in response to receiving each pre-fetch map data tile, determine, at the client device, if the tile budget has been met.

16. The non-transitory computer-readable medium storing instructions claim 15, wherein the instructions to prioritize, at the client device, the plurality of the map points of interest in an order from highest to lowest, when executed by a processor, further cause the processor to prioritize the plurality of map points of interest based on user usage data.

17. The non-transitory computer-readable medium storing instructions of claim 16, wherein the instructions to prioritize, at the client device, the plurality of the map points of interest in an order from highest to lowest based on prior access of the plurality of the map points of interest by the client device, when executed by a processor, further cause the processor to prioritize the plurality of map points of interest based on which map points of interest were most recently accessed.

18. The non-transitory computer-readable medium storing instructions of claim 16, wherein the instructions to prioritize, at the client device, the plurality of the map points of interest in an order from highest to lowest based on prior access of the plurality of the map points of interest by the client device, when executed by a processor, further cause the processor to prioritize the plurality of map points of interest based on which map points of interest were most frequently accessed.

19. The non-transitory computer-readable medium storing instructions of claim 12, wherein the instructions to prioritize, at the client device, the plurality of the map points of interest in an order from highest to lowest based on prior access of the plurality of the map points of interest by the client device, when executed by a processor, further cause the processor to prioritize the plurality of map points of interest based on an amount of time a map point of interest is displayed on a previously rendered visual display of map data.

20. The non-transitory computer-readable medium storing instructions of claim 12, wherein the instructions to prioritize, at the client device, the plurality of the map points of interest in an order from highest to lowest based on prior access of the plurality of the map points of interest by the client device, when executed by a processor, further cause the processor to prioritize the plurality of map points of interest based on previous user selection.

21. The non-transitory computer-readable medium storing instructions of claim 12, wherein the instructions, when executed by a processor, cause the processor to identify, from a plurality of zoom levels, one or more zoom levels, such that the pre-fetch map data tiles are identified based on the one or more map points of interest and the identified one or more zoom levels.

22. The non-transitory computer-readable medium storing instructions of claim 21, wherein the map data at each zoom level is stored in map data tiles having a same memory allocation size.

23. A computer system for fetching map tile data to be used in constructing a visual display of map data on a client device, the computer system comprising:

one or more processors; and one or more memories storing a plurality of modules including instructions for execution on the one or more processors, the modules including a display module including instructions executed on the one or more processors to construct and display the visual display of the map data, where the map data is stored in a remote map database as a plurality of map data tiles;

a map point identifier module including instructions executed on the one or more processors to prioritize, at the client device, the plurality of the map points of interest in an order from highest to lowest, to identify one or more map points of interest that define pre-fetch map data tiles that are requested from a remote map database and stored on the client device for eventual rendering of a visual display of map data in response to a subsequent user request, wherein each pre-fetch map data tile includes vector data for the client device to construct a portion of a map for display at a single zoom level;

a database interface module including instructions executed on the one or more processors to request, from the map database, the pre-fetch map data tiles in order from highest to lowest priority from the remote map database and to receive a subset of the pre-fetch map data tiles from the remote map database; and a tile budget module including instructions executed on the one or more processors to determine, at the client device, a tile budget for storing the pre-fetch map data tiles at the client device, and during receiving of the subset of the pre-fetch map data tiles, to determine if tile budget has been met by the received subset of the pre-fetch map data tiles, where, if the tile budget has been met by the received subset of the pre-fetch map data tiles, the database interface module is to stop receiving additional pre-fetch map data tiles from the remote map database, and if the tile budget has not been met, the database interface module sends a signal to the hardware server communicatively coupled to the remote map database to send a next subset of the pre-fetch map data tiles;

wherein the subset of the pre-fetch map data tiles includes a higher priority than the next subset of the of the pre-fetch map data tiles and the client device is to continue receiving additional, prioritized subsets of the pre-fetch map data tiles from the map database until the tile budget is met or until all pre-fetch map data tiles corresponding to the one or more map points of interest have been received at the client device.

24. The computer system of claim 23, wherein the tile budget is a preset total number of map data tiles that are to be received at the client device.

25. The computer system of claim 23, wherein the tile budget is a preset total amount of map data that is to be received at the client device.

26. The computer system of claim 23, wherein the tile budget module includes further instructions executed on the one or more processors to determine if the tile budget has been met upon receipt of each pre-fetch map data tile.

27. The computer system of claim 23, wherein the map point identifier module includes further instructions executed on the one or more processors to:

identify a plurality of the map points of interest each corresponding to a portion of the pre-fetch map data tiles.

28. The computer system of claim 27, wherein the database interface module includes further instructions executed on the one or more processors to request the pre-fetch map data tiles for each of the plurality of map points of interest in order from highest to lowest, until the tile budget module determines that the tile budget has been reached.

29. The computer system of claim 27, wherein the map point identifier module further prioritizes the plurality of map points of interest based on user usage data.

30. The computer system of claim 27, wherein the map point identifier module further prioritizes the plurality of map points of interest based on which map points of interest were most recently accessed.

31. The computer system of claim 27, wherein the map point identifier module further prioritizes the plurality of map points of interest based on which map points of interest were most frequently accessed.

32. The computer system of claim 27, wherein the map point identifier module further prioritizes the plurality of map points of interest based on an amount of time a map point of interest is displayed on a previous visual display of map data.

33. The computer system of claim 27, wherein the map point identifier module further prioritizes the plurality of map points of interest based on user selection.

34. The computer system of claim 27, further comprising:

a zoom level module that includes further instructions executed on the one or more processors to identify, from a plurality of zoom levels, one or more zoom levels, such that the pre-fetch map data tiles are defined based on the one or more map points of interest and the identified one or more zoom levels, and wherein the remote map database stores map data at different zoom levels, each zoom level containing a respective set of map data tiles.

35. The computer system of claim 34, wherein the map data at each zoom level is stored in map data tiles having a same memory allocation size.

* * * * *